US011153753B2

(12) United States Patent
Park et al.

(10) Patent No.: US 11,153,753 B2
(45) Date of Patent: Oct. 19, 2021

(54) METHOD FOR PROVIDING PAYMENT SERVICE AND ELECTRONIC DEVICE THEREFOR

(71) Applicant: Samsung Electronics Co., Ltd., Suwon-si (KR)

(72) Inventors: Chanpyo Park, Seoul (KR); Jooyoun Paek, Seoul (KR); Heejung Kim, Seongnam-si (KR); Youbi Seo, Gwacheon-si (KR); Byungin Yu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 15/773,387

(22) PCT Filed: Nov. 1, 2016

(86) PCT No.: PCT/KR2016/012442
§ 371 (c)(1),
(2) Date: May 3, 2018

(87) PCT Pub. No.: WO2017/078365
PCT Pub. Date: May 11, 2017

(65) Prior Publication Data
US 2018/0322484 A1  Nov. 8, 2018

(30) Foreign Application Priority Data
Nov. 4, 2015  (KR) .................. 10-2015-0154824

(51) Int. Cl.
*G06Q 20/36* (2012.01)
*G06Q 30/06* (2012.01)
(Continued)

(52) U.S. Cl.
CPC ............ *H04W 12/06* (2013.01); *G06F 3/041* (2013.01); *G06F 3/048* (2013.01); *G06K 9/00* (2013.01);
(Continued)

(58) Field of Classification Search
CPC ........ H04W 12/06; G06F 3/041; G06F 3/048; G06K 9/00; G06Q 20/02; G06Q 20/10; G06Q 20/105; G06Q 20/1085
See application file for complete search history.

(56) References Cited

U.S. PATENT DOCUMENTS 10,387,014 B2 * 8/2019 Kim .................... G06F 3/04886
10,482,461 B2 * 11/2019 Van Os .................. G06Q 20/40
(Continued)

FOREIGN PATENT DOCUMENTS

CN   101276447 A   10/2008
CN   101796478 A   8/2010
(Continued)

OTHER PUBLICATIONS

European Search Report dated Aug. 9, 2018, Issued in European Application No. 16862381.7-1217 / 3370195.
(Continued)

*Primary Examiner* — Talia F Crawley
(74) *Attorney, Agent, or Firm* — Jefferson IP Law, LLP

(57) ABSTRACT

Various examples of the present invention relate to a device and a method for providing a mobile payment service and a membership management service in an electronic device, wherein the electronic device comprises a touch screen and a processor configured to control the touch screen, and wherein the processor can control the touch screen such that: a first screen corresponding to at least one electronic card is displayed, when a touch input for at least a partial region of the touch screen is detected, and a second screen corre-
(Continued)

sponding to the membership management service is displayed in at least a partial region of the first screen, when a touch input for a membership management service icon included in the partial region of the first screen is detected. Other examples are possible.

19 Claims, 41 Drawing Sheets

(51) Int. Cl.
| | |
|---|---|
| G06Q 20/10 | (2012.01) |
| H04W 12/06 | (2021.01) |
| G06F 3/041 | (2006.01) |
| G06Q 20/22 | (2012.01) |
| G06Q 20/32 | (2012.01) |
| G06Q 20/40 | (2012.01) |
| G06K 9/00 | (2006.01) |
| G06F 3/048 | (2013.01) |
| G06Q 20/16 | (2012.01) |
| G06Q 20/38 | (2012.01) |
| G06Q 20/02 | (2012.01) |
| G06Q 40/02 | (2012.01) |
| G06Q 20/34 | (2012.01) |
| G06Q 20/20 | (2012.01) |

(52) U.S. Cl.
CPC .......... *G06Q 20/02* (2013.01); *G06Q 20/10* (2013.01); *G06Q 20/105* (2013.01); *G06Q 20/1085* (2013.01); *G06Q 20/16* (2013.01); *G06Q 20/204* (2013.01); *G06Q 20/206* (2013.01); *G06Q 20/227* (2013.01); *G06Q 20/32* (2013.01); *G06Q 20/3227* (2013.01); *G06Q 20/3255* (2013.01); *G06Q 20/3274* (2013.01); *G06Q 20/3276* (2013.01); *G06Q 20/3278* (2013.01); *G06Q 20/34* (2013.01); *G06Q 20/36* (2013.01); *G06Q 20/363* (2013.01); *G06Q 20/367* (2013.01); *G06Q 20/3674* (2013.01); *G06Q 20/38* (2013.01); *G06Q 20/382* (2013.01); *G06Q 20/3823* (2013.01); *G06Q 20/38215* (2013.01); *G06Q 20/4012* (2013.01); *G06Q 20/40145* (2013.01); *G06Q 40/02* (2013.01); *G06K 9/00087* (2013.01)

(56) References Cited

U.S. PATENT DOCUMENTS

| | | | |
|---|---|---|---|
| 2010/0242110 A1 | 9/2010 | Louch et al. | |
| 2012/0172026 A1 | 7/2012 | Kwon et al. | |
| 2012/0290449 A1* | 11/2012 | Mullen | G06Q 20/3278 |
| | | | 705/27.2 |
| 2013/0332228 A1* | 12/2013 | Lim | G06Q 30/0641 |
| | | | 705/7.29 |
| 2014/0149198 A1* | 5/2014 | Kim | G06Q 30/0226 |
| | | | 705/14.27 |
| 2014/0191994 A1* | 7/2014 | Chung | G06F 3/0483 |
| | | | 345/173 |
| 2014/0215336 A1* | 7/2014 | Gardenfors | G06F 3/017 |
| | | | 715/719 |
| 2014/0244494 A1 | 8/2014 | Davis et al. | |
| 2014/0333632 A1* | 11/2014 | Kim | G06F 3/04883 |
| | | | 345/467 |
| 2014/0372299 A1* | 12/2014 | Singh | G06Q 20/36 |
| | | | 705/41 |
| 2015/0227925 A1 | 8/2015 | Filler | |
| 2015/0302396 A1* | 10/2015 | Jeon | G06Q 20/36 |
| | | | 705/41 |
| 2015/0317293 A1* | 11/2015 | Greisson | H04M 1/72436 |
| | | | 715/256 |
| 2015/0348002 A1* | 12/2015 | Van Os | G06Q 20/3278 |
| | | | 705/44 |
| 2016/0004416 A1* | 1/2016 | Kim | G06F 3/04845 |
| | | | 715/769 |
| 2016/0247144 A1* | 8/2016 | Oh | G06Q 20/321 |
| 2016/0253669 A1* | 9/2016 | Yoon | G06Q 20/327 |
| | | | 705/75 |
| 2016/0364563 A1* | 12/2016 | Ahmad | G06F 3/0488 |
| 2017/0024724 A1* | 1/2017 | Kwak | G06Q 20/227 |
| 2018/0330363 A1* | 11/2018 | Paek | G06Q 20/3278 |

FOREIGN PATENT DOCUMENTS

| | | |
|---|---|---|
| CN | 103477304 A | 12/2013 |
| CN | 204650596 U | 9/2015 |
| EP | 2 717 552 A1 | 4/2014 |
| JP | 2014-128028 A | 7/2014 |
| KR | 10-2013-0089902 A | 8/2013 |
| KR | 10-2013-0138659 A | 12/2013 |
| KR | 10-2014-0096208 A | 8/2014 |
| KR | 10-1460179 B1 | 11/2014 |
| KR | 10-2015-0047914 A | 5/2015 |
| KR | 10-2015-0048370 A | 5/2015 |
| KR | 20150047914 A | 5/2015 |

OTHER PUBLICATIONS

Indian Office Action dated Sep. 23, 2020, issued in Indian Application No. 201817017472.

Anonymous, "Widget (GUI)—Wikipedia, the free encyclopedia", Apr. 27, 2013, XP055295196, Retrieved from the Internet: URL: https://en.Wikipedia.org/w/index.php?title=Widget_(GUI)&oldid=552467683 [retrieved on Aug. 12, 2016].

European Office Action dated Mar. 2, 2021, issued in European Patent Application No. 16862381.7-1213.

Chinese Office Action dated Jun. 25, 2021, issued in Chinese Application No. 201680064709.5.

\* cited by examiner

METHOD FOR PROVIDING PAYMENT SERVICE AND ELECTRONIC DEVICE THEREFOR

TECHNICAL FIELD

The present disclosure relates to an apparatus and a method for providing a mobile payment service and a membership management service in an electronic device.

BACKGROUND ART

With the development of information and communication technology and semiconductor technology, electronic devices are evolving into multimedia devices that provide various services. For example, a portable electronic device may provide various services such as a broadcast service, a wireless Internet service, a camera service, and a mobile payment service.

When a user of an electronic device purchases an item at a store, the user can settle payment for the item using an electronic card registered in the electronic device rather than using a real card (e.g., a credit card).

DETAILED DESCRIPTION OF THE INVENTION

Technical Problem

When a mobile payment service is provided, the user of the electronic device can execute a mobile payment application to select a card (e.g., a credit card or a gift card) to be used for payment. The electronic device can provide a payment service using the card selected by the user.

The user of the electronic device may execute the mobile payment application to select a membership management card (e.g., a membership card) for point accumulation or use of accumulated points. The electronic device may accumulate or use points using the membership management card selected by the user.

Accordingly, the user of the electronic device has to inconveniently perform a troublesome procedure such as executing a mobile payment application and selecting a card or a membership management card to be used for payment in order to use a mobile payment service.

Therefore, the present disclosure has been made in view of the above-mentioned problems, and an aspect of the present disclosure is to provide a device and method for providing a complex payment service for a payment service and a membership management service in an electronic device.

Another aspect of the present disclosure is to provide a device and method for conveniently managing an electronic card in an electronic device.

Technical Solution

In accordance with an aspect of the present disclosure, there is provided an electronic device including: a touch screen; and a processor configured to control the touch screen to display a first screen corresponding to at least one electronic card when a touch input for at least a partial region of the touch screen is detected, and control the touch screen to display a second screen corresponding to a membership management service in at least a partial region of the first screen when a touch input for a membership management service icon included in the partial region of the first screen.

In accordance with another aspect of the present disclosure, there is provided an operating method of an electronic device, including: detecting a touch input for at least a partial region of a touch screen operatively connected to the electronic device; displaying a first screen corresponding to at least one electronic card in response to the touch input; detecting a touch input for a membership management service icon included in the partial region of the first screen; and displaying a second screen corresponding to a membership management service in at least a partial region of the first screen in response to the touch input for the membership management service.

Advantageous Effects

An electronic device according to various embodiments and an operating method thereof may provide a widget type user interface in which a payment service and a membership management service can be used in one screen, thereby simplifying the operation of a user using a mobile payment service.

An electronic device according to various embodiments and an operating method thereof may arrange and display membership management service information according to priorities in a user interface for a payment service and a membership management service, thereby enhancing the convenience of a user using the membership management service.

An electronic device according to various embodiments and an operating method thereof may provide a widget type user interface including card information for at least one of a payment service, a membership management service, and personal information management, thereby enhancing the convenience of a user using an electronic card.

MODE FOR CARRYING OUT THE INVENTION

Figure 1:
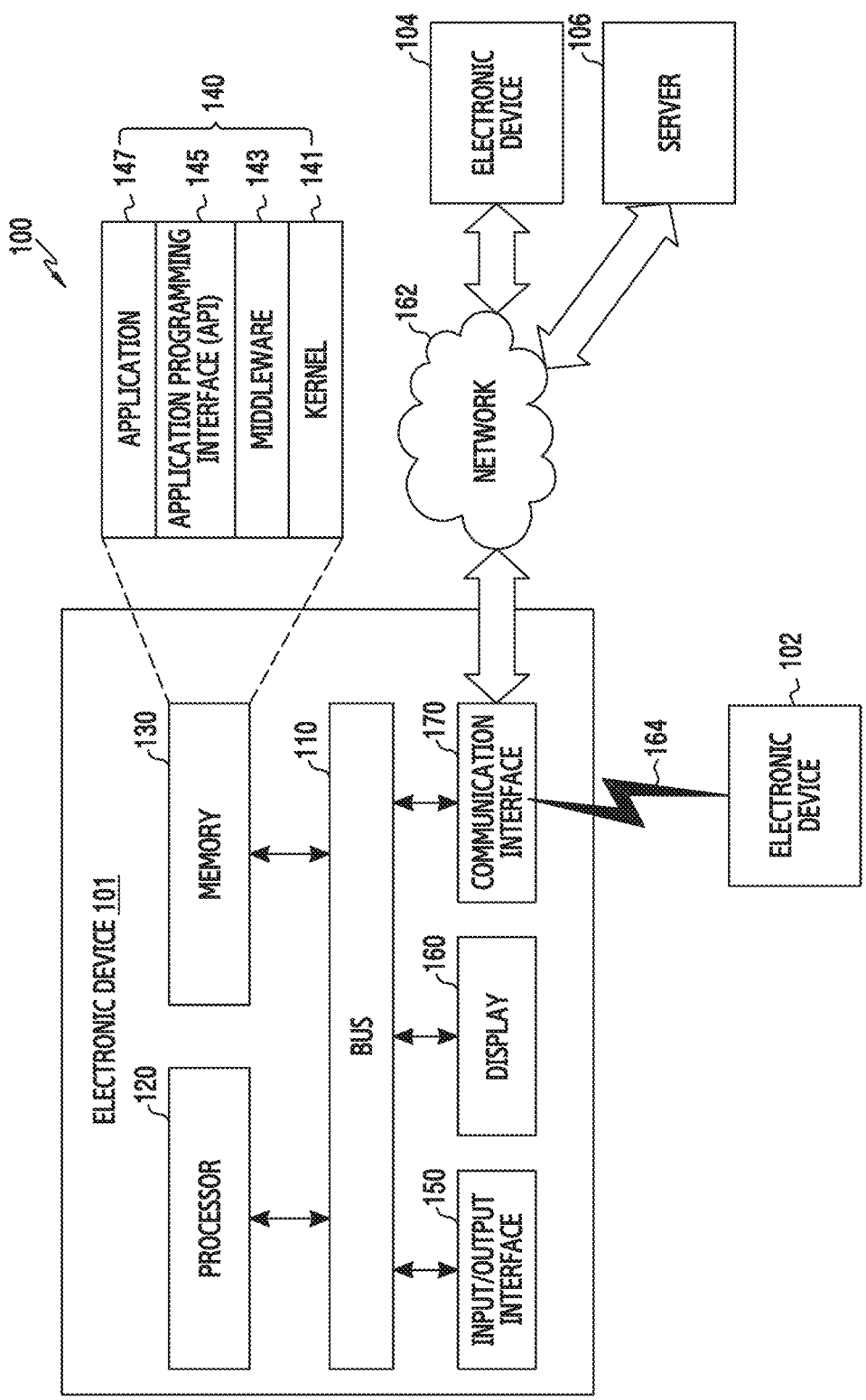
FIG. 1 is a block diagram illustrating an electronic device according to various embodiments of the present disclosure.

Hereinafter, various embodiments of the present disclosure are disclosed with reference to the accompanying drawings. However, it should be understood that it is not intended to limit various embodiments of the present disclosure to a particular form but, on the contrary, the intention is to cover various modifications, equivalents, and/or alternatives of the embodiments of the present disclosure. In relation to descriptions of the drawings, like reference numerals can be used for similar components.

In the disclosure, an expression such as "have", "can have", "include" or "can include" refers to presence of a corresponding characteristic (e.g., a number, a function, an operation, or a component such as a part), and does not exclude presence of an additional characteristic.

In the disclosure, an expression such as "A or B", "at least one of A or/and B", or "one or more of A or/and B" can include any and every combination of items listed together. For example, "A or B", "at least one of A and B", or "at least one of A or B" can indicate the entire of (1) a case of including at least one A, (2) a case of including at least one B, or (3) a case of including both at least one A and at least one B.

Expressions such as "first," "second," "primarily," or "secondary" used in various embodiments can represent various elements regardless of order and/or importance and do not limit corresponding elements. Such expressions are used for distinguishing one element from another element. For example, a first user device and a second user device can represent different user devices regardless of order or importance. For example, a first element can be referred to as a second element without deviating from the scope of the present disclosure, and similarly, a second element may be referred to as a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure, for example, may include at least one of a smartphone, a tablet personal computer (PC), a mobile phone, a video phone, an electronic book (e-book) reader, a laptop PC, a netbook computer, a personal digital assistant (PDA), a portable multimedia player (PMP), a navigation device, an MP3 player, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

The electronic device according to various embodiments of the present disclosure may be a combination of one or more of the aforementioned various devices. The electronic device according to some embodiments of the present disclosure may be a flexible device. Further, the electronic device may be configured in a curved shape on one side or both sides of the touch screen. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

In the following description, a widget mode may include a graphic user interface (GUI) for more smoothly supporting interaction between a user of an electronic device, and an application thereof. For example, the widget mode may represent a small application configured to include some functions of the application.

In the following description, a touch input may represent a user input such as touch, tap, touch and movement, or the like detected through a touch screen. The touch may include a state in which a touch input means (e.g., a finger or a touch accessory) is in proximity to or in contact with the touch screen. The tab may include a state in which a touch and a touch release for a specific touch point occur sequentially. The touch and movement may include a state in which the touch point is moved while the touch is maintained. For example, the touch and movement can be referred to as drag.

In the following description, an electronic card may include a card for payment, a banking card, a membership management card, and a personal information management card. For example, the card for payment may include at least one of a credit card, an anonymous prepaid card (e.g., a gift card), a check card, and a debit card. The membership management card may include a membership card for providing member management services such as point use or point earning. The banking card may include a cash card capable of depositing and withdrawing money through an automated teller machine (ATM). The personal information management card may include at least one of a resident card, a driver's license, and a passport that can represent user's personal information.

FIG. 1 is a block diagram illustrating an electronic device according to various embodiments of the present disclosure.

Referring to FIG. 1, an electronic device 101 may include a bus 110, a processor 120, a memory 130, an input/output interface 150, a display 160, and a communication interface 170. In some embodiments, the electronic device 101 may omit at least one of the components, or may additionally include other components.

The bus 110 may include a circuit for connecting the components 120 to 170 of the electronic device 101 to each other and for communicating (e.g., control messages and/or data) between the components.

The processor 120 may include one or more of a central processing unit (CPU), an application processor (AP), and a communication processor (CP). The processor 120 may perform computations or data processing related to, for example, control and/or communication of at least one other component of the electronic device 101.

According to one embodiment, the processor 120 may execute a widget mode for managing at least one electronic card when it detects a touch input for some regions of a touch screen (e.g., a widget mode execution region). For example, the processor 120 may keep the widget mode execution region (e.g., an icon for executing a widget mode) active when a widget mode execution menu is activated. The processor 120 may control the display 160 to display at least one piece of electronic card information registered in the widget mode when it detects a touch and movement input for the widget mode execution region through the input/output interface 150 (e.g., a touch panel). The processor 120 may control the display 160 to display a guidance message corresponding to the type of the electronic card to be displayed on the display 160, together with an image of the electronic card. For example, the at least one electronic card registered in the widget mode may include at least some of the electronic cards registered in an application corresponding to the widget mode.

According to one embodiment, the processor 120 may change information of the electronic card when it detects the touch input of the electronic card displayed on the display 160 by the widget mode. For example, the processor 120 may control the display 160 to display detailed information (e.g., card number, e-mail, site address, etc.) of the corresponding electronic card when it detects a tab input on the image of the electronic card displayed on the display 160. For example, the processor 120 may control the display 160 to display the image of the corresponding electronic card when it detects a tap input for the detailed information of the electronic card displayed on the display 160.

According to one embodiment, the processor 120 may set a lock function on a personal information management card registered in the widget mode when it displays the personal information management card on the display 160. For example, the processor 120 may control the display 160 to display personal information contained in the personal information management card in a hidden state. The processor 120 may release the hidden state of the personal information contained in the personal information management card when a user is authenticated through fingerprint recognition or a password input. That is, the processor 120 may control the display 160 to display the personal information contained in the personal information management card. For example, the processor 120 may eliminate the image of the personal information management card acquired to register the personal information management card when it registers the personal information management card in the widget mode. That is, the processor 120 may eliminate the image of the personal information management card registered in a gallery application when it registers the personal information management card in the widget mode.

According to one embodiment, the processor 120 may scroll an electronic card list to correspond to a touch input for electronic card information displayed on the display 160 when there is a plurality of electronic cards registered in the widget mode. For example, when the processor 120 detects a touch and movement input for the electronic card information displayed on the display 160, the processor 120 may determine a scroll variable based on at least one of a position where the touch and movement input is detected, movement intensity, and a movement distance. The processor 120 may perform scrolling on the electronic card information displayed on the display 160 to correspond to the scroll variable. For example, the scroll variable may include at least one of a scroll speed and a scroll interval.

According to one embodiment, the processor 120 may additionally execute a membership management service in the widget mode when it detects a touch input for a complex payment service execution menu. For example, when the processor 120 detects a touch input of a membership management service icon displayed on a partial region (for example, a partial region of the upper right corner) of a widget mode screen, the processor 120 may control the display 160 to display membership management service information so that the membership management service information is partially overlapped with the electronic card information displayed on the display 160. For example, the membership management service information may include an icon (e.g., a thumbnail) of a membership management card registered in an application corresponding to the widget mode and a membership management code (e.g., a bar code or a membership management number).

According to one embodiment, when the membership management service is additionally executed in the widget mode, the processor 120 may arrange the membership management service information according to a priority order. For example, in consideration of at least one of the location of the electronic device, beacon information that the electronic device receives, the popularity ranking of the membership card, and the frequency of use of the membership card, the processor 120 may set the priority of the membership card registered in the application corresponding to the widget mode. The processor 120 may arrange the membership management service information displayed on the display 160 to correspond to the priority of the membership card registered in the application corresponding to the widget mode.

According to one embodiment, the processor 120 may register at least one membership card in the widget mode based on a touch input for a thumbnail of the membership card included in the membership management service information. For example, when the processor 120 detects a touch and movement input for a thumbnail of a first membership card in the membership management service information displayed on the display 160, the processor 120 may confirm a point where the touch and movement input is released. The processor 120 may register the first membership card as the electronic card in the widget mode when the touch and movement input for the thumbnail of the first membership card is released from an electronic card registration region.

According to one embodiment, when the processor 120 executes the application corresponding to the widget mode by the touch input for an application execution menu, the processor 120 may activate the lock function of the application. For example, when the processor 120 detects a touch input of an application execution icon displayed on a partial region (e.g., a partial region of the upper left corner) of the widget mode screen, the processor 120 may confirm whether the electronic device 101 is locked. The processor 120 may control the display 160 to display a lock screen when the electronic device 101 is locked. In this case, the processor 120 may control the display 160 to display an execution screen of the application when the electronic device 101 is unlocked based on input information corresponding to the lock screen. The processor 120 may activate the lock function of the application when the lock of the electronic device 101 is not set. For example, the processor 120 may control the display 160 to display the lock screen of the application. In this case, the processor 120 may control the display 160 to display the execution screen of the application when the application is unlocked based on the input information corresponding to the lock screen of the application. For example, the lock function of the application may include at least one of password setting and fingerprint authentication.

According to one embodiment, the processor 120 may set the lock function of the electronic device 101 through the lock screen of the application. For example, the processor 120 may control the display 160 to display a lock setting request message when it detects a touch input for lock setting information contained in the lock screen of the application. The processor 120 may lock the electronic device 101 based on input information on a lock setting menu included in the lock setting request message.

According to one embodiment, the processor 120 may provide a payment service using a card for payment registered in the widget mode. For example, the processor 120 may activate a payment function using the corresponding card when user authentication is successful in a state in which the card for payment is selected among the electronic cards registered in the widget mode. The processor 120 may additionally set a security mode for the payment function based on at least one of the movement and payment function activation time information of the electronic device 101 in a state in which the payment function is activated. For example, when a movement value of the electronic device 101 is larger than a reference movement value or when a movement distance of the electronic device 101 is larger than a reference movement distance in a state where the payment function is activated, the processor 120 may switch the activated payment function to an inactive state. For example, the processor 120 may switch the activated payment function to the inactive state when the active state of the payment function is maintained to exceed a reference time.

The memory 130 may include volatile and/or non-volatile memory. The memory 130 may store commands or data (e.g., electronic card information) associated with at least one other component of the electronic device 101. According to one embodiment, the memory 130 may store software and/or programs 140. For example, the program may include a kernel 141, a middleware 143, an application programming interface (API) 145, an application program (or "app") 147, or the like. At least some of the kernel 141, the middleware 143, and the API 145 may be referred to as an operating system (OS).

The input/output interface 150 may serve as an interface through which commands or data input from a user or other external devices can be transferred to another component(s) of the electronic device 101. For example, the input/output interface 150 may include a touch panel that detects a touch input or a hovering input using an electronic pen or a portion of a user's body. For example, the touch panel may detect the touch input or the hovering input based on a change in capacitance due to the electronic pen or the portion of the user's body in a capacitive method. According to one embodiment, the input/output interface 150 may receive a gesture or a proximity input using the electronic pen or the portion of the user's body.

The display 160 may display various contents (e.g., text, images, video, icons, symbols, etc.) to a user. For example, the display 160 may display electronic card information registered in the widget mode when the processor 120 executes the widget mode. For example, when the processor 120 additionally executes a membership management service in the widget mode, the display 160 may display membership management service information partially overlapped with electronic card information. For example, the display 160 may display the electronic card information and the membership management service information such that they are partially overlapped with each other through different display layers.

The communication interface 170 may establish communication between the electronic device 101 and an external device. For example, the communication interface 170 may communicate with an external device (e.g., a first external electronic device 102) via short-range communication 164. For example, the short-range communication 164 may include at least one of Bluetooth, Bluetooth low energy (BLE), infrared data association (IrDA), ultra wideband (UWB), magnetic secure transmission (MST), and near field communication (NFC). For example, the communication interface 170 may be connected to a network 162 via wireless or wired communication to communicate with an external device (e.g., a second external electronic device 104 or a server 106). For example, the network 162 may include at least one of a telecommunications network, a computer network (e.g., a LAN or WAN), the Internet, and a telephone network.

According to one embodiment, the electronic device 101 may generate a magnetic field signal corresponding to payment information (e.g., card information for payment) through the MST of the communication interface 170 via a coil antenna, and may transmit the generated magnetic field signal to a point-of-sale (POS) device, thereby providing a mobile payment service.

According to one embodiment, the touch panel of the input/output interface 150 and the display 160 may be formed as one module and may be referred to as a touch screen.

Figure 2:
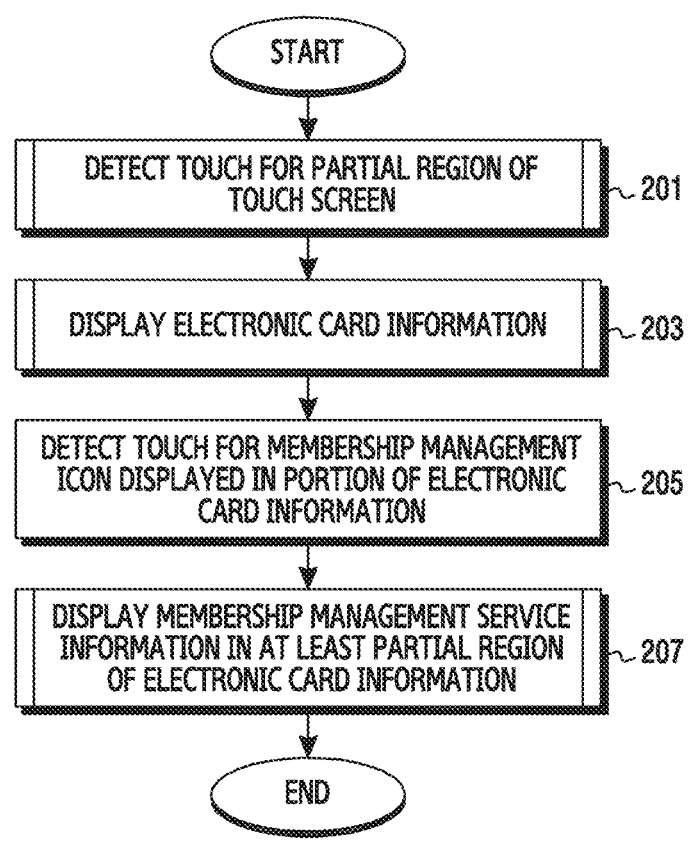
FIG. 2 is a flowchart illustrating displaying a user interface for complex payment service in an electronic device according to various embodiments of the present disclosure.
Figure 5A:
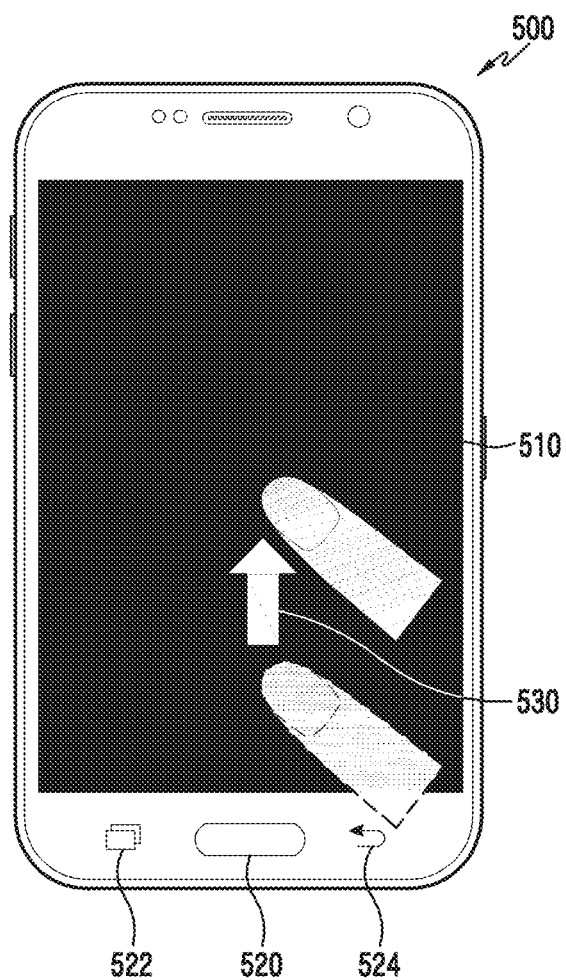
FIGS. 5A to 5I illustrate a screen configuration for displaying electronic card information in an electronic device according to various embodiments of the present disclosure.
Figure 5B:
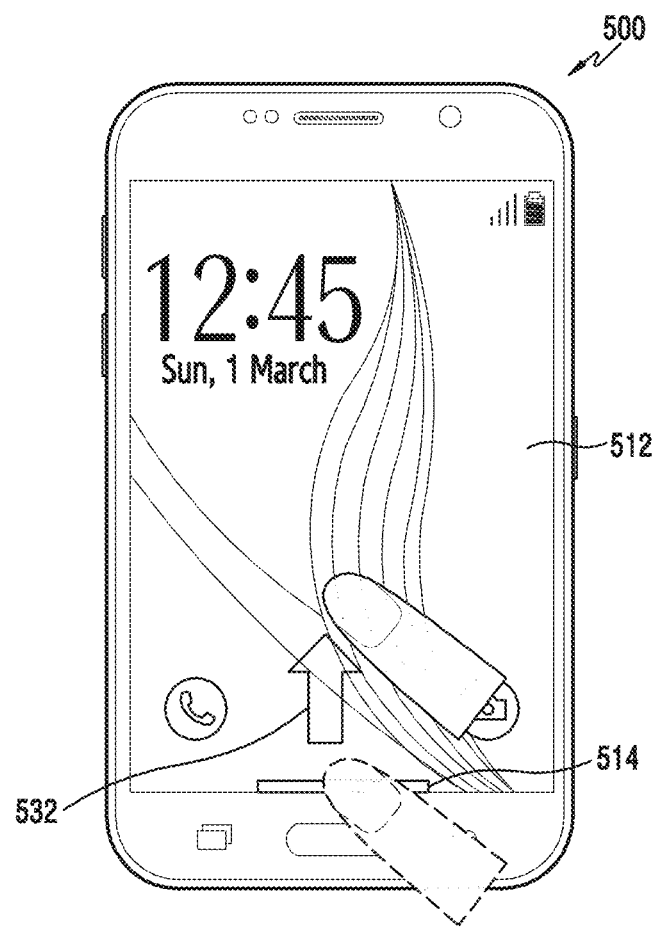
Figure 5C:
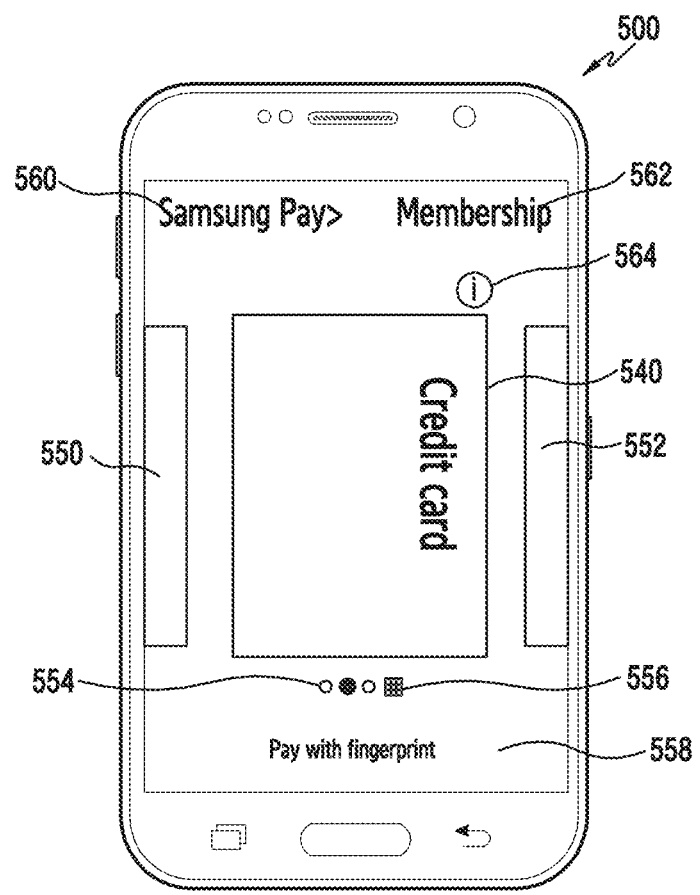
Figure 5D:
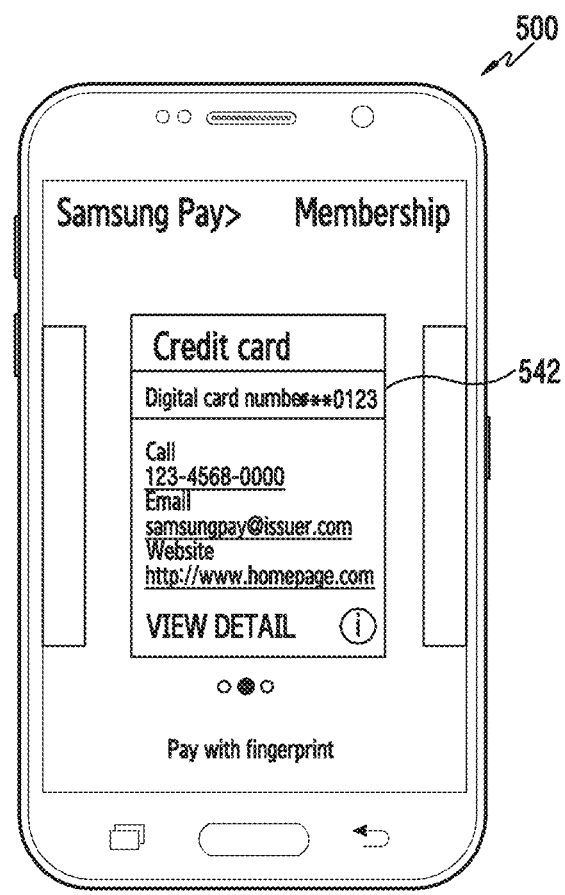
Figure 5E:
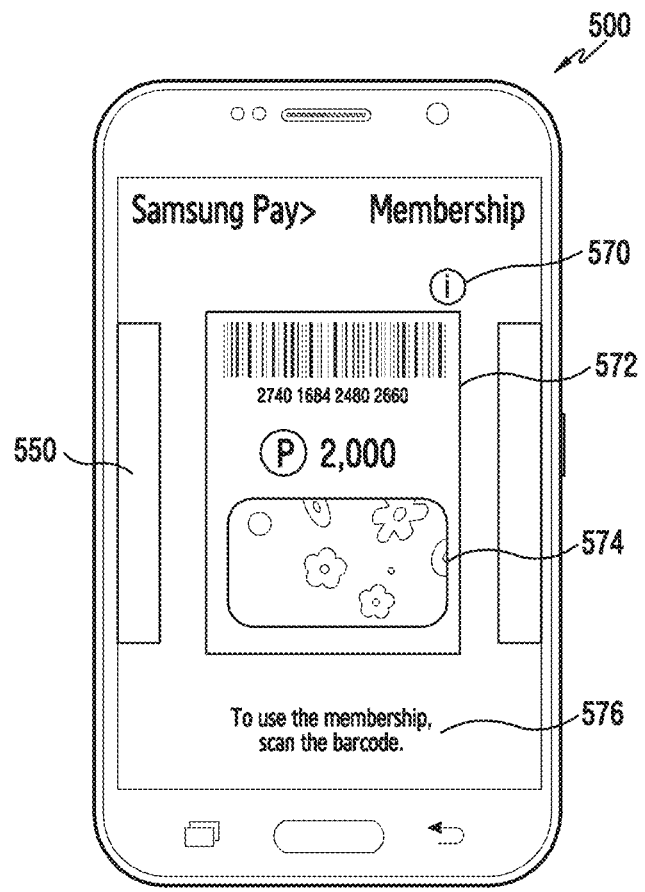
Figure 5F:
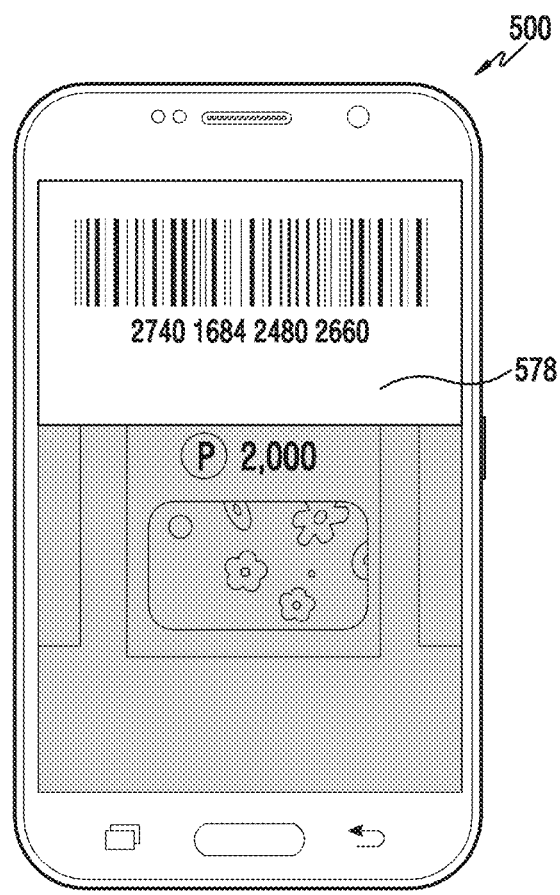
Figure 5G:
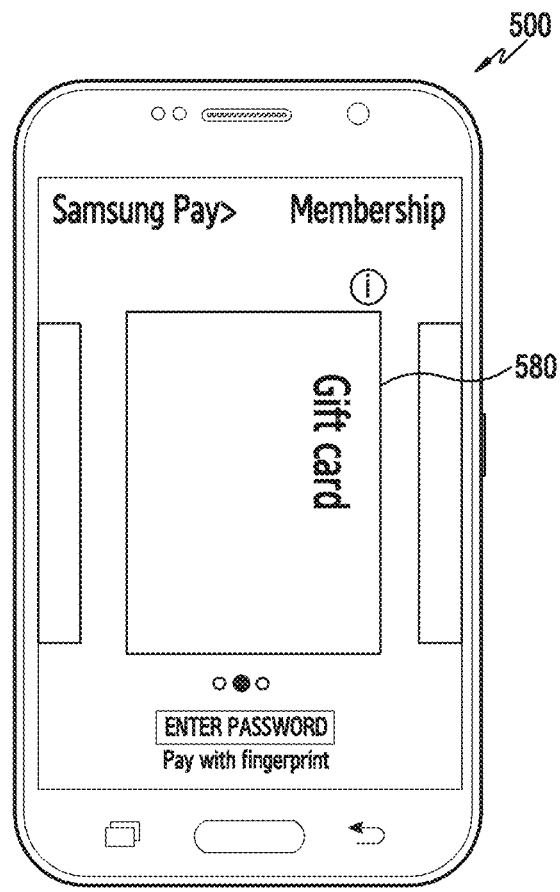
Figure 5H:
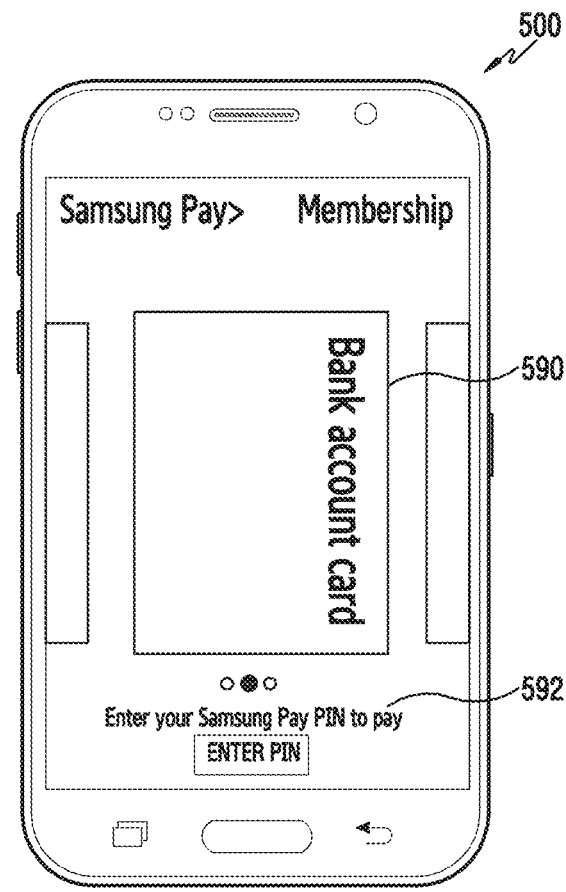
Figure 5I:
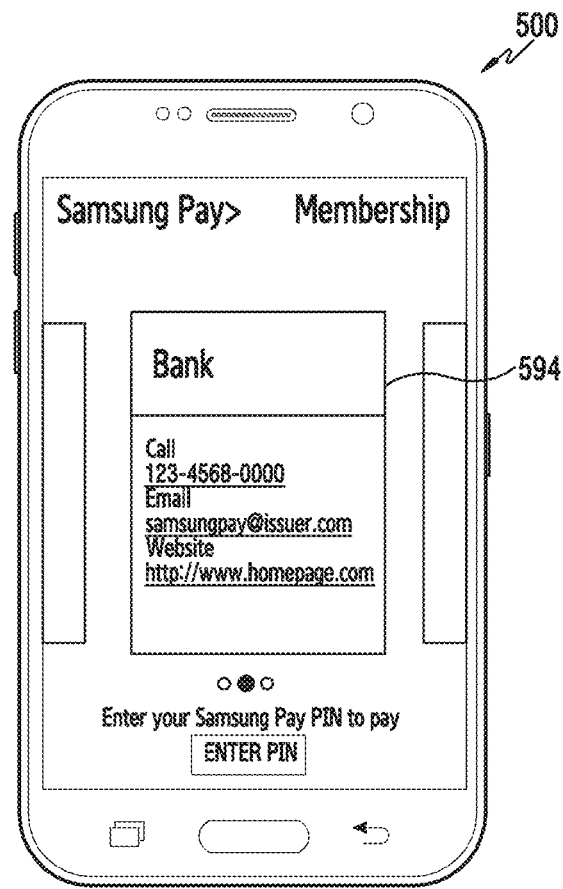
Figure 6A:
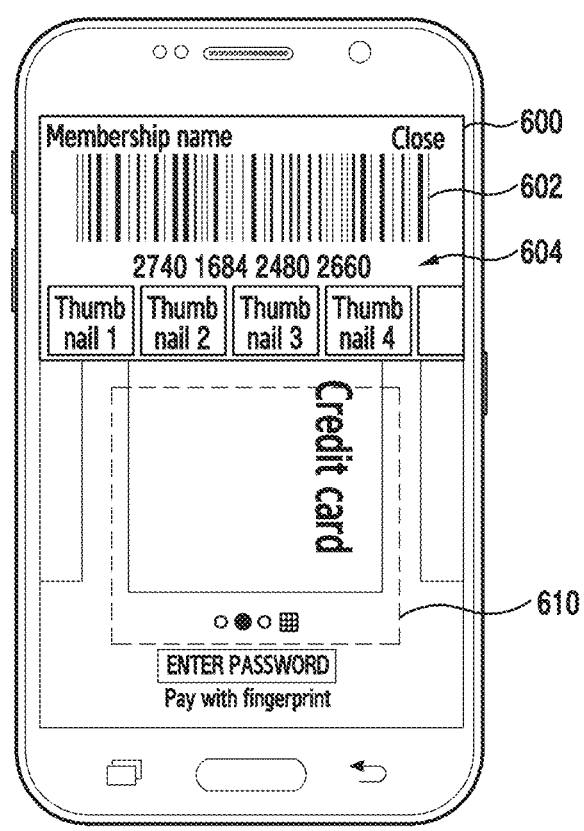
FIGS. 6A to 6C illustrate a screen configuration for displaying membership management service information in an electronic device according to various embodiments of the present disclosure.
Figure 6B:
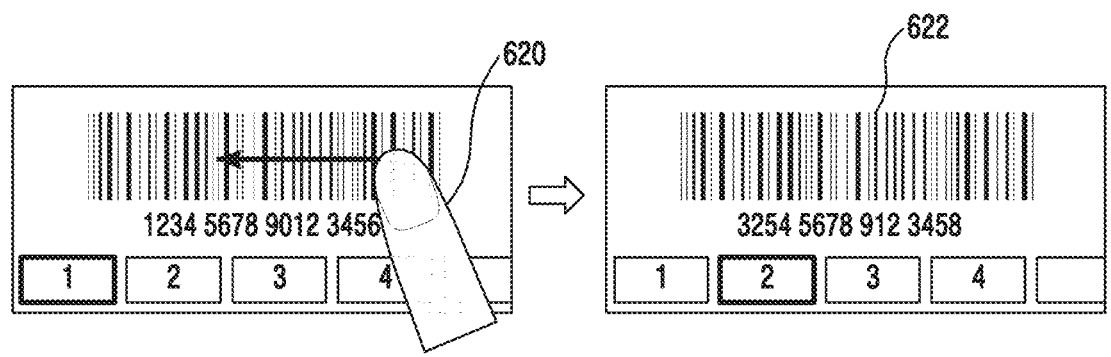
Figure 6C:
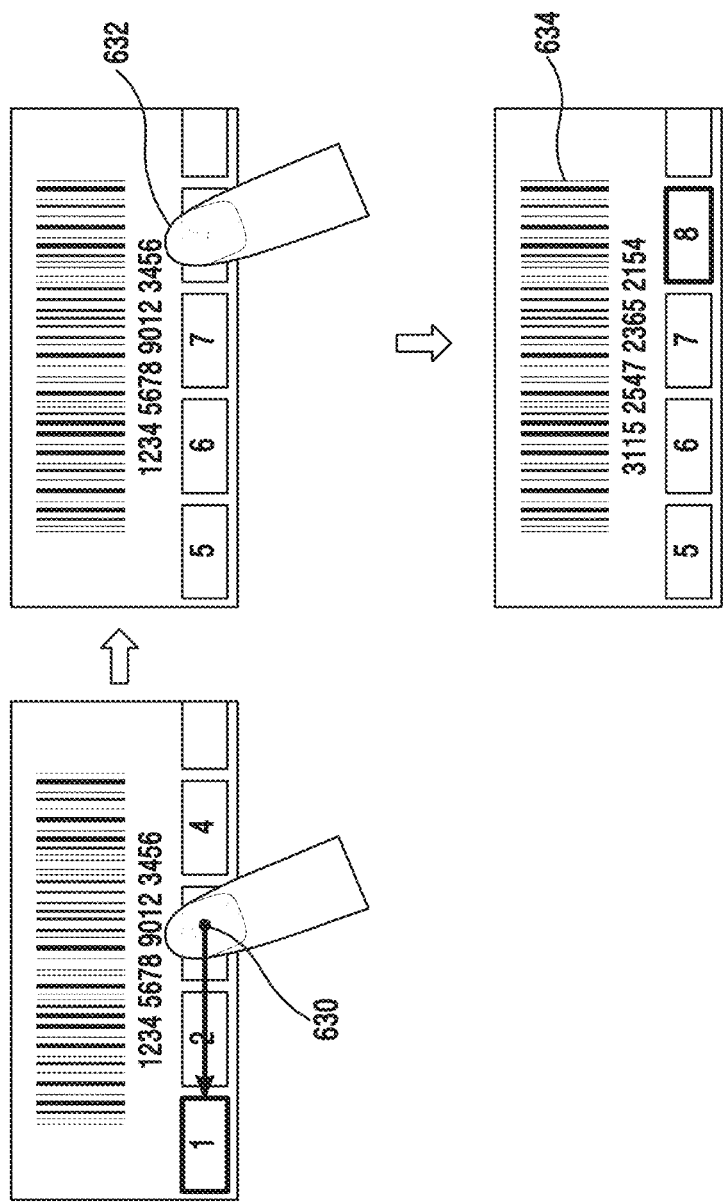

FIG. 2 is a flowchart for displaying a user interface for complex payment service in an electronic device according to various embodiments of the present disclosure. In the following description, an operation for displaying a user interface for a complex payment service using the screen configuration of FIGS. 5A to 5I and 6A to 6C will be described. FIGS. 5A to 5I illustrate screen configurations for displaying electronic card information in an electronic device according to various embodiments of the present disclosure. FIGS. 6A to 6C illustrate screen configurations for displaying membership management service information in an electronic device according to various embodiments of the present disclosure.

Referring to FIG. 2, in operation 201, an electronic device (e.g., the electronic device 101) may detect a touch input for some regions set as a widget mode execution region on a touch screen. For example, the processor 120 may keep a touch detection function of the widget mode execution region active when a widget mode execution menu is activated. Accordingly, the processor 120 may confirm whether a touch and movement input 530 for the widget mode execution region is detected in a state where the display 160 is in an inactive state 510, as shown in FIG. 5A.

For example, the widget mode execution region may be set as a partial region of the touch screen adjacent to a home button 520 of an electronic device 500 in which a widget mode execution icon is displayed. For example, the processor 120 may determine whether the touch and movement input 532 for the widget mode execution region is detected in a state 512 in which the display 160 is active, as shown in FIG. 5B. For example, the electronic device 500 may be configured such that a recently executed application button 522 and a return button 524 are located on both sides of the home button 520. At this time, each of the home button 520, the recently executed application button 522, and the return button 524 may be implemented as a physical button or a touch button.

In operation 203, the electronic device may display at least one piece of electronic card information registered in a widget mode when the touch input for the widget mode execution region is detected on the touch screen. For example, the processor 120 may control the display 160 to display a widget mode screen including an image 540 of a credit card for payment, as shown in FIG. 5C. For example, the processor 120 may control the display 160 to display the widget mode screen that includes information 570 of a membership management card (e.g., a membership card) for a membership management service, as shown in FIG. 5E. For example, the processor 120 may control the display 160 to display a widget mode screen including an image 580 of an anonymous prepaid card for payment, as shown in FIG. 5G. For example, the processor 120 may control the display 160 to display a widget mode screen including an image 590 of a bank card for banking, as shown in FIG. 5H.

In operation 205, the electronic device may detect a touch input for a membership management icon located in a partial region of the display in which the electronic card information is displayed. For example, the processor 120 may confirm whether a tab input for a membership management service icon 562 included in the widget mode screen including the electronic card information is detected, as shown in FIG. 5C. For example, the widget mode screen may include an electronic card image 540 and other electronic card information (e.g., thumbnails) 550 and 552 adjacent to the electronic card on both sides of the electronic card image 540, as shown in FIG. 5C. The widget mode screen may include an application switching icon 560 and a membership management service icon 562 on the upper side of the electronic card image 540. In addition, the widget mode screen may further include at least one of position information 554 of the electronic card displayed among the electronic cards registered in the widget mode, an entire card list icon 556, a guidance message 558 of the electronic card, and a detailed information icon 564 of the electronic card.

In operation 207, when the electronic device detects the touch input for the membership management icon, the electronic device may display membership management service information in a partial region of the electronic card information displayed on the display. For example, when the processor 120 detects a tap input for a membership management service icon 562 in FIG. 5C, the processor 120 may display membership management service information 600 so that the membership management service information 600 is partially overlapped with a portion of the electronic card image displayed on the display 160 as shown in FIG. 6A. For example, the membership management service information 600 may include a membership management card icon (e.g., a thumbnail) 604 registered in the application corresponding to the widget mode and a membership management code 602 corresponding to the membership management card.

Figure 3:
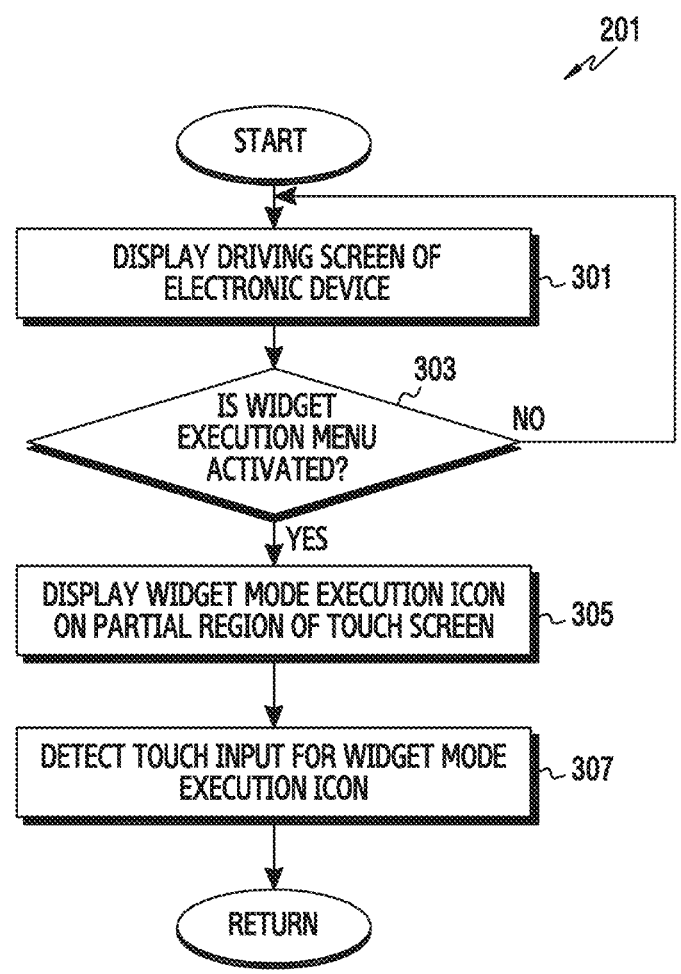
FIG. 3 is a flowchart illustrating detecting a touch input for the execution of a widget mode in an electronic device according to various embodiments of the present disclosure.

FIG. 3 is a flowchart for detecting a touch input for the execution of a widget mode in an electronic device according to various embodiments of the present disclosure. In the following description, an operation for detecting the touch input for executing the widget mode in operation 201 of FIG. 2 using the screen configuration of FIG. 5B will be described.

Referring to FIG. 3, in operation 301, an electronic device (e.g., the electronic device 101) may display a driving screen of the electronic device on a display. For example, the processor 120 may control the display 160 to display a lock screen 512 based on the input information detected through the input/output interface 150, as shown in FIG. 5B. For example, the driving screen of the electronic device may further include any one of a standby screen and an application execution screen (service providing screen).

In operation 303, the electronic device may determine whether the widget mode execution menu is activated. For example, the processor 120 may determine whether a menu for setting whether the widget mode is executed is set to an active state.

In operation 301, when the widget mode execution menu is inactivated, the electronic device may maintain the driving screen of the electronic device displayed on the display.

In operation 305, when the widget mode execution menu is activated, the electronic device may display the widget mode execution icon in a partial region of the driving screen of the electronic device. For example, the processor 120 may control the display 160 to display the widget mode execution icon 514 in the widget mode execution region set in partial region of the touch screen adjacent to the home button 520 of the electronic device 500, as shown in FIG. 5B.

In operation 307, the electronic device may detect a touch input for the widget mode execution icon displayed on the partial region of the driving screen of the electronic device. For example, the processor 120 may determine whether the touch and movement input 532 for the widget mode execution icon 514 displayed in the widget mode execution region adjacent to the home button 520 of the electronic device 500 is detected, as shown in FIG. 5B.

Figure 4:
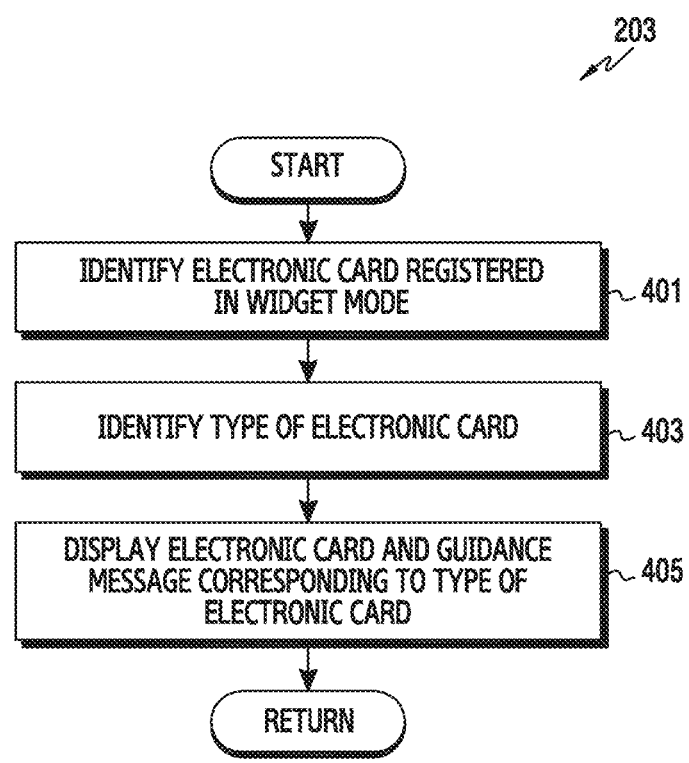
FIG. 4 is a flowchart illustrating displaying electronic card information in an electronic device according to various embodiments of the present disclosure.

FIG. 4 is a flowchart for displaying electronic card information in an electronic device according to various embodiments of the present disclosure. In the following description, an operation for displaying the electronic card information in operation 203 of FIG. 2 using the screen configurations of FIGS. 5C, 5E, and 5H will be described.

Referring to FIG. 4, in operation 401, an electronic device (e.g., the electronic device 101) may identify at least one electronic card registered in the widget mode. For example, the processor 120 may identify the electronic card that is additionally registered in the widget mode in order to display the electronic card through the widget mode among the electronic cards registered in the application corresponding to the widget mode.

In operation 403, the electronic device may identify the type of the electronic card to be displayed on the display among the at least one electronic card registered in the widget mode. For example, the processor 120 may identify the type of the electronic card to be displayed on the display 160 by executing the widget mode. For example, the type of the electronic card may include at least one of a card for payment, a banking card, a card for membership management service, and a personal information management card.

In operation 405, the electronic device may display a guidance message corresponding to the image of the electronic card and the type of electronic card, on the display. For example, when displaying the card information for payment as shown in FIG. 5C, the processor 120 may control the display 160 to display the electronic card image 540 and the guidance message 558 requesting security authentication for the payment service to corresponding to the card for payment. For example, when displaying the card information for the membership management service as shown in FIG. 5E, the processor 120 may control the display 160 to display the electronic card information 570 and a guidance message 576 requesting a barcode scan for point management. For example, the electronic card information 570 for the membership management service may include code information 572 of the electronic card and an image 574 of the electronic card. For example, when displaying the card information for the banking service as shown in FIG. 5H, the processor 120 may control the display 160 to display the bank card image 590 and a guidance message 592 requesting a cryptographic key (PIN) input for banking.

According to one embodiment, the electronic device (e.g., the electronic device 101) may change display information corresponding to the electronic card based on the touch input for the electronic card information displayed on the widget mode screen. For example, when the processor 120 detects a tap input for the credit card image 540 displayed on the display 160 as shown in FIG. 5C, the processor 120 may switch the credit card image 540 displayed on the display 160 to detailed information (e.g., card number, e-mail, home page address, etc.) 542 of the credit card as shown in FIG. 5D. When detecting the tap input for the detailed information 542 of the credit card displayed on the display 160 as shown in FIG. 5D, the processor 120 may switch the detailed information 542 of the credit card displayed on the display 160 to the credit card image 540 again as shown in FIG. 5C. For example, when detecting a tap input for the bank card image 590 as shown in FIG. 5H, the processor 120 may switch the bank card image 590 displayed on the display 160 to detailed information (e.g., card number, e-mail, home page address, etc.) 594 of the bank card as shown in FIG. 5I. When detecting a tap input for the detailed information 594 of the back card displayed on the display 160 as shown in FIG. 5I, the processor 120 may switch the detailed information 594 of the bank card displayed on the display 160 to the bank card image 590 again as shown in FIG. 5H.

According to one embodiment, the electronic device (e.g., the electronic device 101) may enlarge and display some information of the electronic card based on the touch input for the electronic card information displayed on the widget mode screen. For example, when detecting a tab input for the code image 572 of the membership management card displayed on the display 160, the processor 120 may enlarge and display the code image of the membership management card in a section 578 as shown in FIG. 5F.

Figure 7:
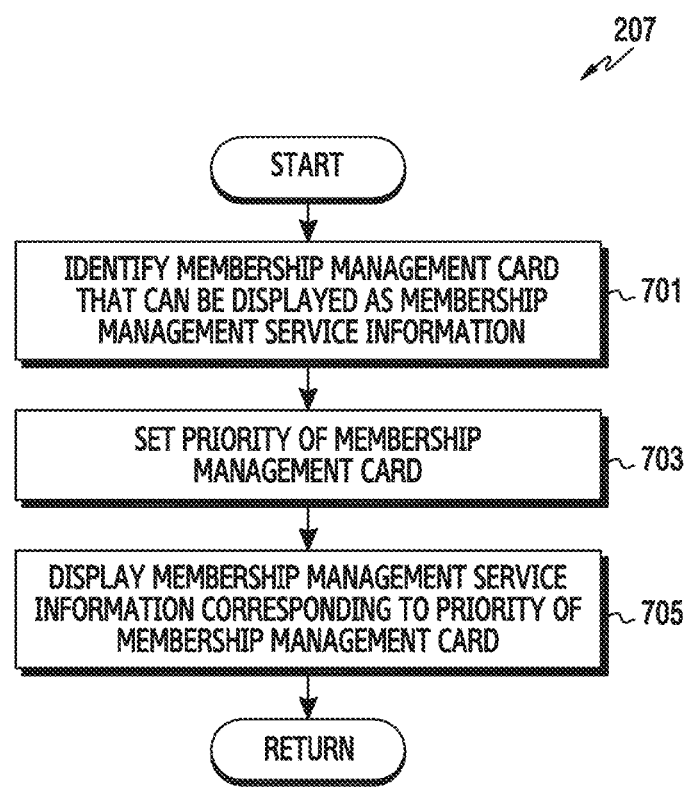
FIG. 7 is a flowchart illustrating arranging and displaying membership management service information in an electronic device according to various embodiments of the present disclosure.

FIG. 7 is a flowchart for arranging and displaying membership management service information in an electronic device according to various embodiments of the present disclosure. In the following description, an operation for displaying the membership management service information in operation 207 of FIG. 2 using the screen configurations of FIGS. 6A to 6C will be described.

Referring to FIG. 7, in operation 701, an electronic device (e.g., the electronic device 101) may identify a membership management card that can be displayed as the membership management service information in the widget mode when it detects a touch input for the membership management icon (e.g., operation 205 of FIG. 2). For example, the processor 120 may identify the membership management card registered in the application corresponding to the widget mode. For example, the processor 120 may identify at least one membership management card selected by input information among the membership management cards registered in the application corresponding to the widget mode.

In operation 703, the electronic device may set the priority of the membership management card that can be displayed as the membership management service information in the widget mode. For example, the processor 120 may set the priority of the membership management card based on at least one of the location of the electronic device 101, beacon information that the electronic card 101 receives, the popularity ranking of the membership management card, and the frequency of use of the membership management card. For example, the beacon information may include location-based information (e.g., store, advertisement, etc.) provided based on the location of the electronic device 101.

In operation 705, the electronic device may arrange and display the membership management service information to correspond to the priority of the membership management card. For example, when detecting a tap input of the membership management service icon 562 in FIG. 5C, the processor 120 may display the membership management service information 600 such that the membership management service information 600 is overlapped with a portion of the electronic card image displayed on the display 160 as shown in FIG. 6A. In this case, the processor 120 may arrange the membership management card icon 604 included in the membership management service information 600 to correspond to the priority of the membership management card. The membership management code 602 included in the membership management service information 600 may display the membership management code of the membership management card having the highest priority of the membership management card.

According to one embodiment, when a touch and movement input 620 for the membership management code 602 is detected in the membership management service information 600, the electronic device (e.g., the electronic device 101) may update a membership management code 622 to correspond to the touch and movement input 620, as shown in FIG. 6B. In this case, the electronic device may display selection information on the membership management card icon 604 corresponding to the membership management code 622.

According to one embodiment, when a touch and movement input 630 for the membership management card icon 604 is detected in the membership management service information 600, the electronic device (e.g., the electronic device 101) may update (scroll) the membership management card icon to correspond to the touch and movement input 620, as shown in FIG. 6C. When the membership management code 602 and a selection input (e.g., a tap input) 632 for a different membership management card icon are detected, the electronic device may display a membership management code 634 of the different membership management card icon corresponding to the selection input.

Figure 8:
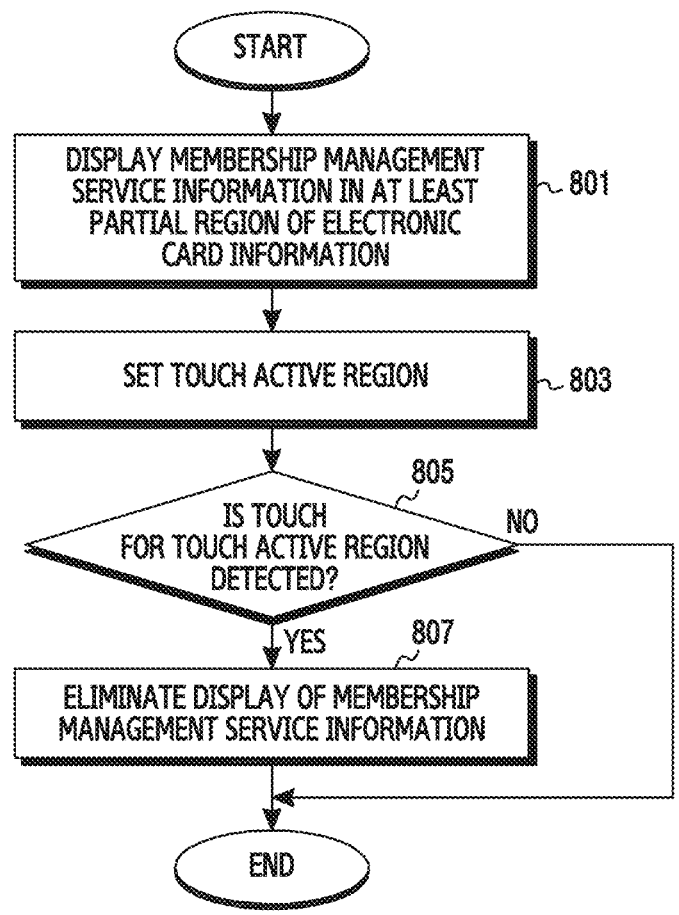
FIG. 8 is a flowchart illustrating eliminating the display of membership management service information in an electronic device according to various embodiments of the present disclosure.

FIG. 8 is a flowchart for eliminating the display of membership management service information in an electronic device according to various embodiments of the present disclosure. In the following description, an operation for eliminating the display of the membership management information using the screen configuration of FIG. 6A will be described.

Referring to FIG. 8, in operation 801, an electronic device (e.g., the electronic device 101) may display membership management service information in a portion of a widget mode screen. For example, the processor 120 may confirm whether a tap input for the membership management service icon 562 is detected in the widget mode screen in which the electronic card information is displayed in FIG. 5C. For example, the processor 120 may display the membership management service information 600 in a partial region of the widget mode screen displayed on the display 160 as shown in FIG. 6A when it detects the tab input for the membership management service icon 562. In this case, the processor 120 may display the membership management service information 600 arranged to correspond to the priority of the membership management card, such as in operations 701 to 705 of FIG. 7.

In operation 803, when the membership management service information is displayed on the partial region of the widget mode screen, the electronic device may set a touch active region that can detect the touch input on the widget mode screen. For example, when the membership management service information 600 is displayed, an incorrect touch input due to a user's grasp or the like may be generated so that the display of the membership management service information 600 may be eliminated regardless of the user's intention. Accordingly, the processor 120 may set at least a portion of a region in which the membership management service information 600 is not displayed on the widget mode screen as a touch active region 610, as shown in FIG. 6A. That is, when the membership management service information 600 is displayed, the processor 120 may limit a region in which a touch input can be detected. At this time, the touch input can be detected in the region in which the membership management service information 600 is displayed.

In operation 805, the electronic device may determine whether a touch input for the touch active region is detected. For example, the processor 120 may determine whether a tap input for the touch active region 610 of FIG. 6A is detected.

In operation 807, when the touch input for the touch active region is detected, the electronic device may eliminate the membership management service information displayed on the display. For example, when the processor 120 detects a tap input to the touch active area 610 of FIG. 6A, the processor 120 may eliminate the display of the membership management service information 600 on the widget mode screen as shown in FIG. 5C.

Figure 9:
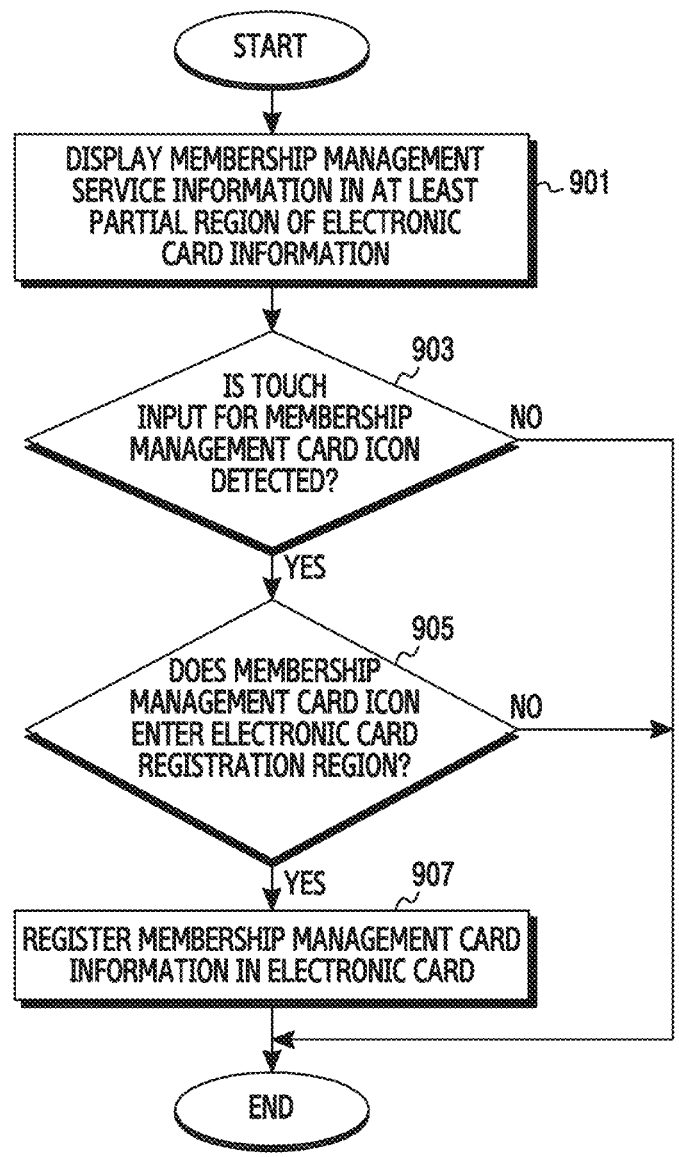
FIG. 9 is a flowchart illustrating registering an electronic card using membership management service information in an electronic device according to various embodiments of the present disclosure.
Figure 10A:
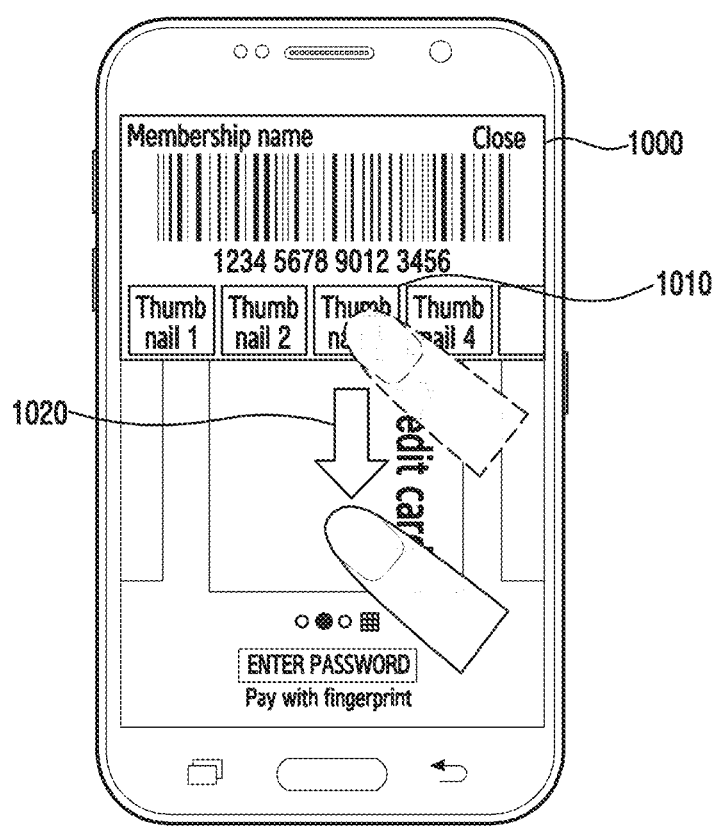
FIGS. 10A and 10B illustrate a screen configuration for registering an electronic card using membership management service information in an electronic device according to various embodiments of the present disclosure.
Figure 10B:
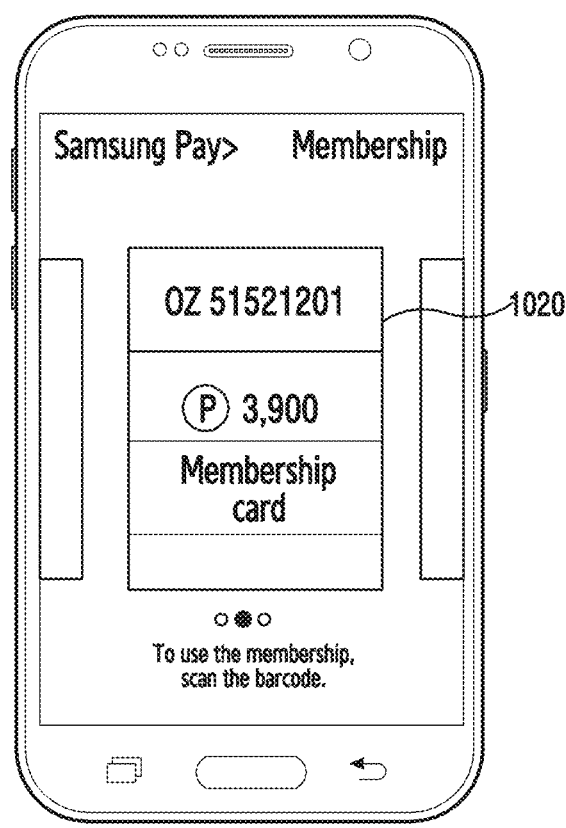

FIG. 9 is a flowchart for registering an electronic card using membership management service information in an electronic device according to various embodiments of the present disclosure. In the following description, an operation for registering an electronic card using the screen configurations of FIGS. 10A and 10B will be described. FIGS. 10A and 10B illustrate a screen configuration for registering an electronic card using membership management service information in an electronic device according to various embodiments of the present disclosure.

Referring to FIG. 9, in operation 901, an electronic device (e.g., the electronic device 101) may display membership management service information in a partial region of a widget mode screen in response to a selection input of the membership management service icon. For example, when a tap input for the membership management service icon 562 shown in FIG. 5C is detected as in operations 205 and 207 of FIG. 2, the processor 120 may display membership management service information 1000 in the partial region of the widget mode screen, as shown in FIG. 10A.

In operation 903, the electronic device may confirm whether a touch input for the membership management card icon included in the membership management service information is detected. For example, the processor 120 may confirm whether a touch and movement input for at least one membership management card icon among the membership management card icons included in the membership management service information 1000 is detected.

In operation 905, when a touch input for the at least one membership management card icon included in the membership management service information is detected, the electronic device may confirm whether the membership management card icon enters an electronic card registration region by the touch input. For example, when a touch and movement input 1020 for a membership management card icon 3 (1010) is detected in the membership management service information 1000 as shown in FIG. 10A, the processor 120 may confirm whether the membership management card icon 3 (1010) enters the electronic card registration region by the touch and movement input 1020. For example, the electronic card registration region may include any one of a region where the electronic card information is displayed on the widget mode screen (region where the membership management service information 1000 is not displayed on the widget mode screen) and the touch active region.

In operation 907, when the at least one membership management card icon enters the electronic card registration region, the electronic device may add the membership management card corresponding to the membership management card icon to the widget mode. For example, when the membership management card icon 3 (1010) enters the electronic card registration region by the touch and movement input as shown in FIG. 10A, the processor 120 may register the membership management card 1020 corresponding to the membership management card icon 3 (1010) as the electronic card of the widget mode as shown in FIG. 10B.

According to various embodiments of the present disclosure, when a release point of the touch and movement input for the membership management card icon is included in the electronic card registration region, the electronic device may add the membership management card corresponding to the membership management card icon to the widget mode.

Figure 11:
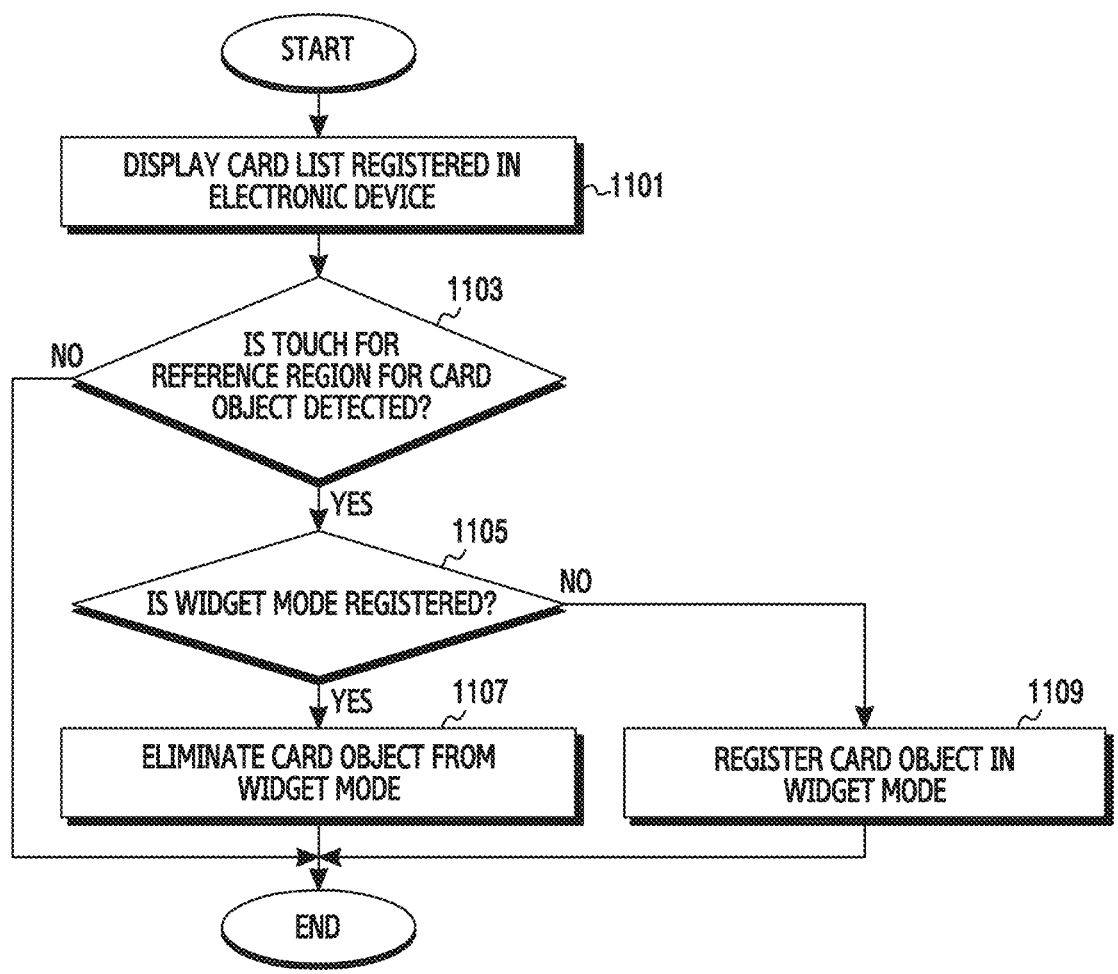
FIG. 11 is a flowchart illustrating registering an electronic card in a widget mode based on touch information of the electronic card in an electronic device according to various embodiments of the present disclosure.
Figure 12A:
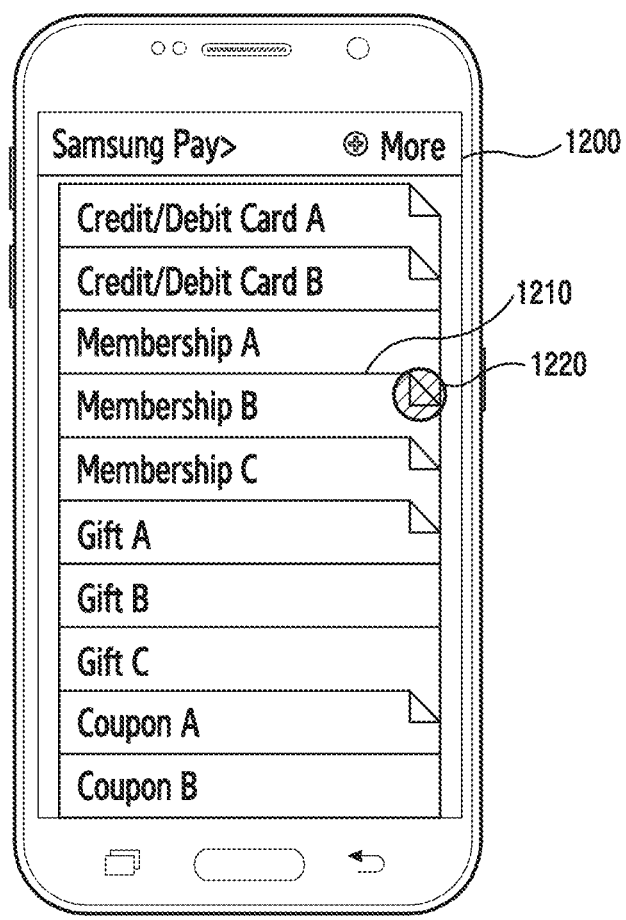
FIGS. 12A and 12B illustrate a screen configuration for registering an electronic card in a widget mode based on touch information of the electronic card in an electronic device according to various embodiments of the present disclosure.
Figure 12B:
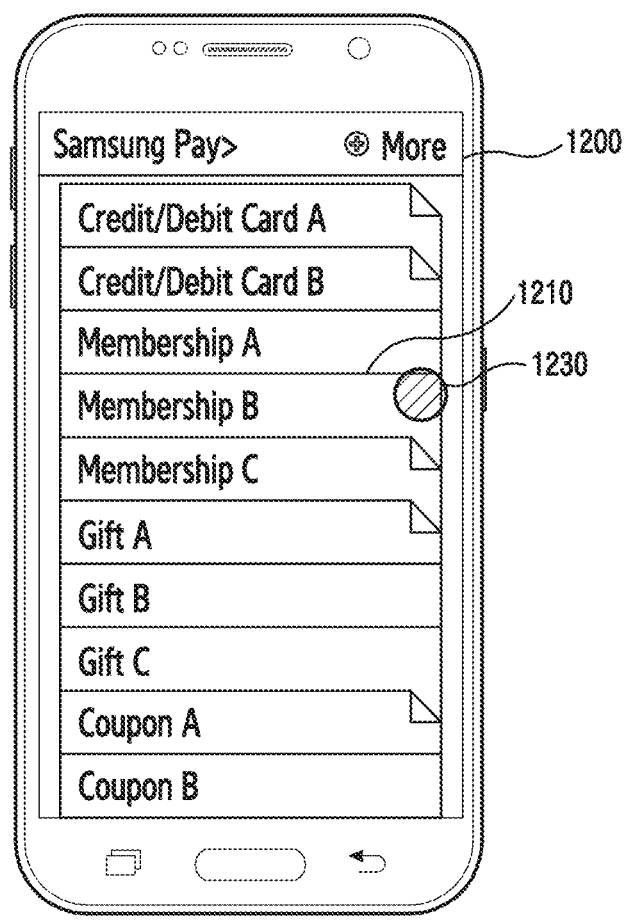

FIG. 11 is a flowchart for registering an electronic card in a widget mode based on touch information of the electronic card in an electronic device according to various embodiments of the present disclosure. In the following description, an operation for registering an electronic card in the widget mode using the screen configurations of FIGS. 12A and 12B will be described. FIGS. 12A and 12B illustrate a screen configuration for registering an electronic card in a widget mode based on touch information of the electronic card in an electronic device according to various embodiments of the present disclosure.

Referring to FIG. 11, in operation 1101, an electronic device (e.g., the electronic device 101) may display an electronic card list registered in an application corresponding to the widget mode. For example, the processor 120 may execute the application corresponding to the widget mode based on input information detected through the input/output interface 150. The processor 120 may control the display 160 to display a list 1200 of at least one electronic card registered in the application, as in FIG. 12A. For example, when the generation of an electronic card list display event is detected in the widget mode, the processor 120 may display the display 160 to display the list 1200 of the at least one electronic card registered in the application, as shown in FIG. 12A. For example, the electronic card list display event may include at least one of selection of an electronic card list display icon and a touch and movement input for a last displayed electronic card.

In operation 1103, the electronic device may confirm whether a touch input for a reference region is detected in the electronic card displayed in the electronic card list. For example, the processor 120 may confirm whether a tab input 1220 for a corner set as the reference region in a membership management card B (1210) is detected in FIG. 12A.

In operation 1105, when the touch input for the reference region set on the electronic card is detected, the electronic device may confirm whether the electronic card in which the touch input is detected is registered in the widget mode. The electronic device may display detailed information of the corresponding electronic card when a touch input for a region other than the reference region set on the electronic card is detected.

In operation 1107, the electronic device may eliminate the electronic card from the widget mode when the electronic card in which the touch input is detected is registered in the widget mode. For example, when the tap input 1220 for the reference region for the membership management card B (1210) registered in the widget mode as shown in FIG. 12A, the processor 120 may release the registration of the membership management card B (1210) for the widget mode. In this case, as shown in FIG. 12B, the processor 120 may control the display 160 to display the corner of the membership management card B (1210) displayed in a folded state to be switched to an unfolded state in order to indicate the release of the registration of the membership management card B (1210) in the widget mode as shown in FIG. 12B.

In operation 1109, when the electronic card in which the touch input is detected is not registered in the widget mode, the electronic device may register the electronic card in the widget mode. For example, when a tab input 1230 of the reference region for the membership management card B (1210) that is not registered in the widget mode is detected as shown in FIG. 12B, the processor 120 may add the membership management card B (1210) to the widget mode. In this case, the processor 120 may control the display 160 to display the corner of the membership management card B (1210) displayed in the unfolded state to be switched to the folded state in order to indicate the registration of the widget mode of the membership management card B (1210) as shown in FIG. 12A.

Figure 13:
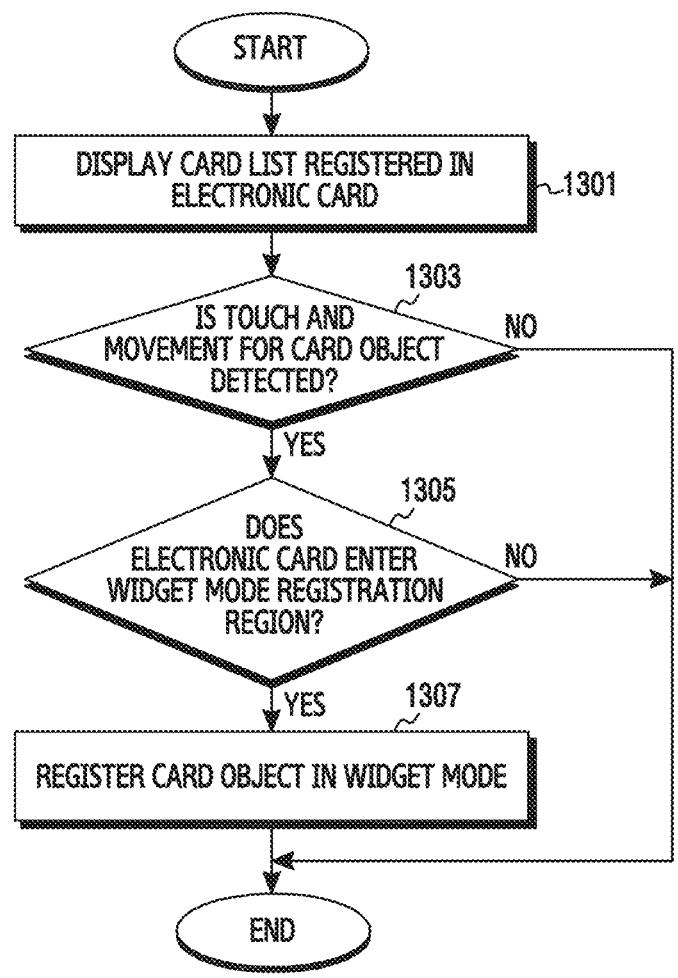
FIG. 13 is a flowchart illustrating registering an electronic card in a widget mode in an electronic device according to various embodiments of the present disclosure.
Figure 14:
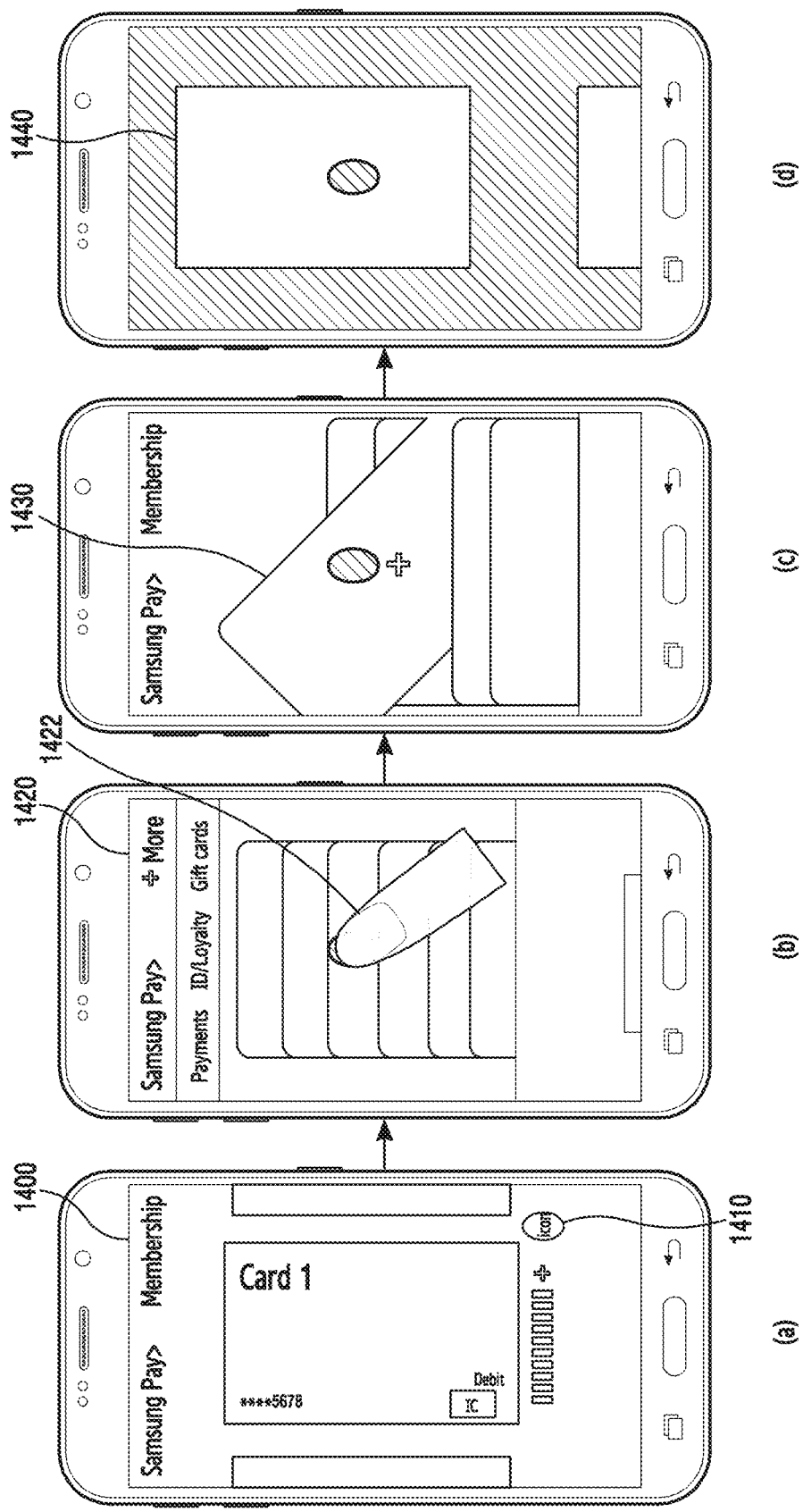
FIG. 14 illustrates a screen configuration for registering an electronic card in a widget mode in an electronic device according to various embodiments of the present disclosure.

FIG. 13 is a flowchart for registering an electronic card in a widget mode in an electronic device according to various embodiments of the present disclosure. In the following description, an operation for registering an electronic card in the widget mode using the screen configuration of FIG. 14 will be described. FIG. 14 illustrates a screen configuration for registering an electronic card in a widget mode in an electronic device according to various embodiments of the present disclosure.

Referring to FIG. 13, in operation 1301, an electronic device (e.g., the electronic device 101) may display an electronic card list registered in an application corresponding to the widget mode. For example, the processor 120 may execute the application corresponding to the widget mode and may control the display 160 to display a list of at least one electronic card registered in the application. For example, when a touch input 1410 for an electronic card list display icon on the widget mode screen is detected as shown in FIG. 14A, the processor 120 may control the display 160 to display a list 1420 of the at least one electronic card registered in the application as shown in FIG. 14B.

In operation 1303, the electronic device may confirm whether a touch and motion input for at least one of the electronic cards included in the electronic card list is detected. For example, the processor 120 may confirm whether a touch and movement input 1422 for the electronic card is detected in the electronic card list 1420, as shown in FIG. 14B.

In operation 1305, the electronic device may confirm whether the corresponding electronic card enters a widget mode registration region by the touch and movement input for the electronic card. For example, the widget mode registration region may be set to an edge of the display 160.

In operation 1307, the electronic device may register the electronic card in the widget mode when the corresponding electronic card enters the widget mode registration region by the touch and movement input for the electronic card. For example, when the electronic card enters a widget mode registration region in a section 1430 by a touch and movement input as shown in FIG. 14C, the processor 120 may add the electronic card that enters the widget mode registration region to the widget mode in a section 1440.

According to various embodiments of the present disclosure, the electronic device may add the corresponding electronic card to the widget mode when a release point of the touch and movement input for the electronic card is included in the widget mode registration region.

Figure 15:
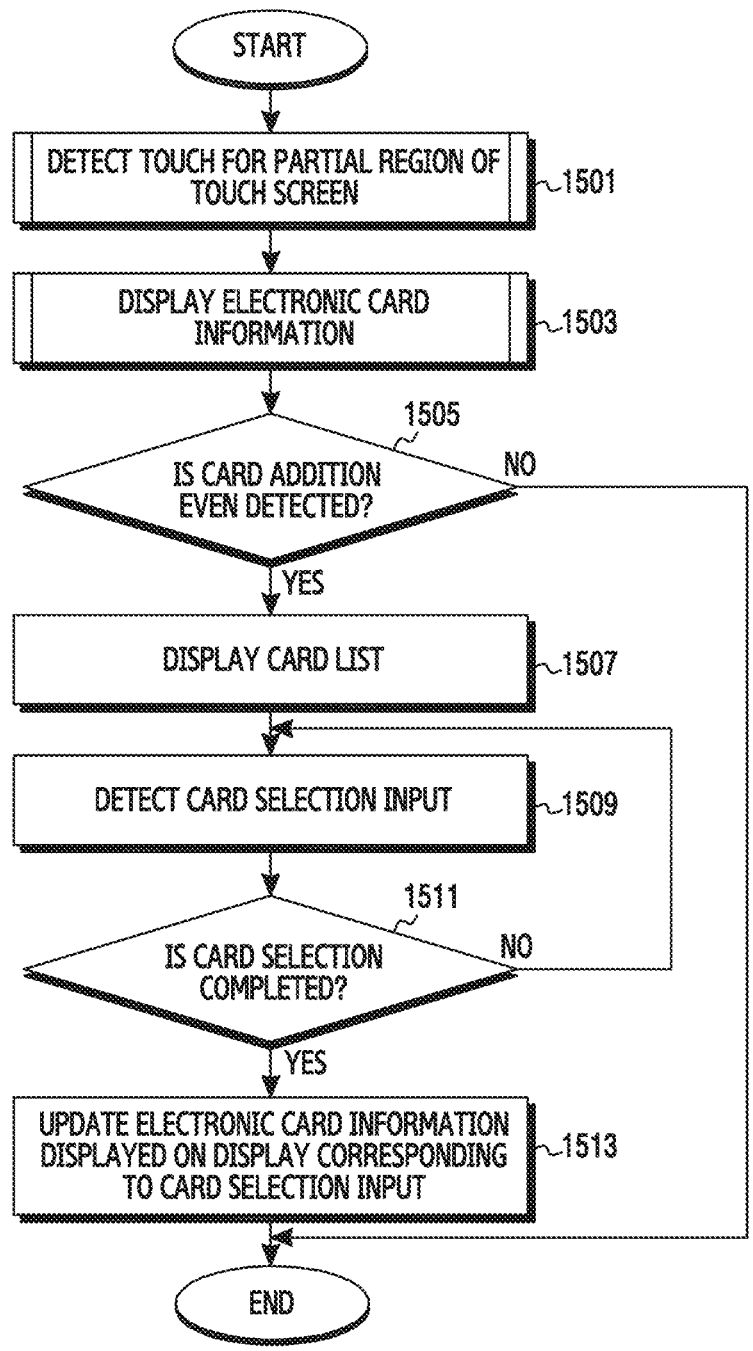
FIG. 15 is a flowchart illustrating adding an electronic card to a widget mode in an electronic device according to various embodiments of the present disclosure.
Figure 16:
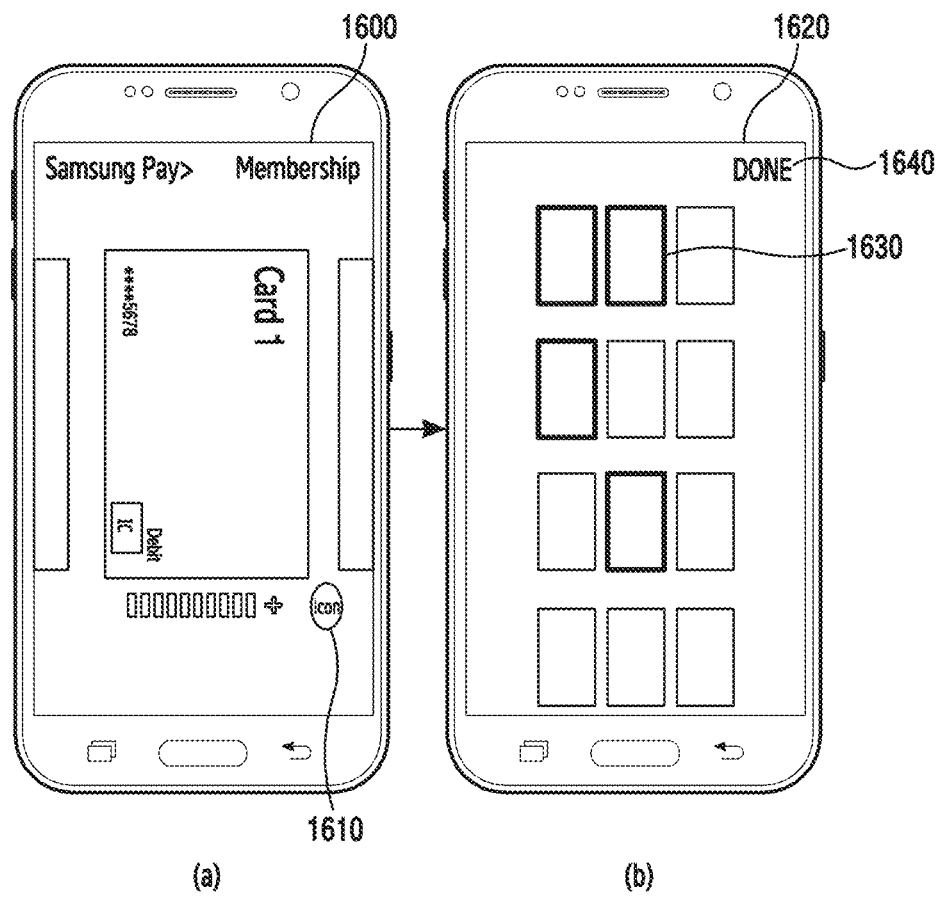
FIG. 16 illustrates a screen configuration for adding an electronic card to a widget mode in an electronic device according to various embodiments of the present disclosure.

FIG. 15 is a flowchart for adding an electronic card to a widget mode in an electronic device according to various embodiments of the present disclosure. In the following description, an operation for registering an electronic card in the widget mode using the screen configuration of FIG. 16 will be described. FIG. 16 illustrates a screen configuration for adding an electronic card to a widget mode in an electronic device according to various embodiments of the present disclosure.

Referring to FIG. 15, in operation 1501, an electronic device (e.g., the electronic device 101) may detect a touch input for a partial region set as a widget mode execution region on a touch screen. For example, the processor 120 may detect a touch and movement input 530 or 532 for the widget mode execution region set in the partial region of the touch screen adjacent to the home button 520 of the electronic device 500 as shown in FIG. 5A or 5B.

In operation 1503, the electronic device may display at least one piece of electronic card information registered in the widget mode when a touch input for the widget mode execution region is detected. For example, the processor 120 may execute the widget mode when it detects the touch input for the widget mode execution region. Accordingly, the processor 120 may control the display 160 to display a widget mode screen 1600 including an image of any one of at least one electronic card registered in the widget mode, as shown in FIG. 16A.

In operation 1505, the electronic device may confirm whether a card addition event occurs. For example, the processor 120 may confirm whether a touch input for an electronic card list display icon 1610 is detected in the widget mode screen 1600 as shown in FIG. 16A. For example, the processor 120 may update an electronic card image by a touch input for the widget mode screen 1600. The processor 120 may determine that the card addition event has occurred, when a touch input for updating the electronic card image is detected while an image of the last electronic card is displayed.

In operation 1507, when the occurrence of the card addition event is detected, the electronic device may display the electronic card list registered in the application corresponding to the widget mode. For example, the processor 120 may control the display 160 to display a list 1620 of at least one electronic card registered in the application corresponding to the widget mode, as shown in FIG. 16B.

In operation 1509, the electronic device may detect a card selection input for the electronic card list. For example, the processor 120 may detect a touch input corresponding to the electronic card list through the input/output interface 150. In this case, the processor 120 may control the display 160 to display selection information 1630 on the electronic card where the touch input is detected. The processor 120 may cancel the selection of the electronic card when the touch input for the once selected electronic card is detected again.

In operation 1511, the electronic device may confirm whether the selection of the electronic card is completed. For example, the processor 120 may confirm whether a selection input of a completion icon (DONE) 1640 is detected in the electronic card list 1620 as shown in FIG. 16B.

The electronic device may continuously detect the selection input of the electronic card to be registered in the widget mode in operation 1509, when the selection of the electronic card is not completed.

In operation 1513, the electronic device may update the electronic card information contained in the widget mode screen to correspond to the electronic card selected in the electronic card list when the selection of the electronic card is completed. For example, the processor 120 may determine at least one electronic card in which the selection input is detected in the electronic card list to be the electronic card to be registered in the widget mode. Accordingly, the processor 120 may control the display 160 to display information on any one of the at least one electronic card in which the selection input is detected.

Figure 17:
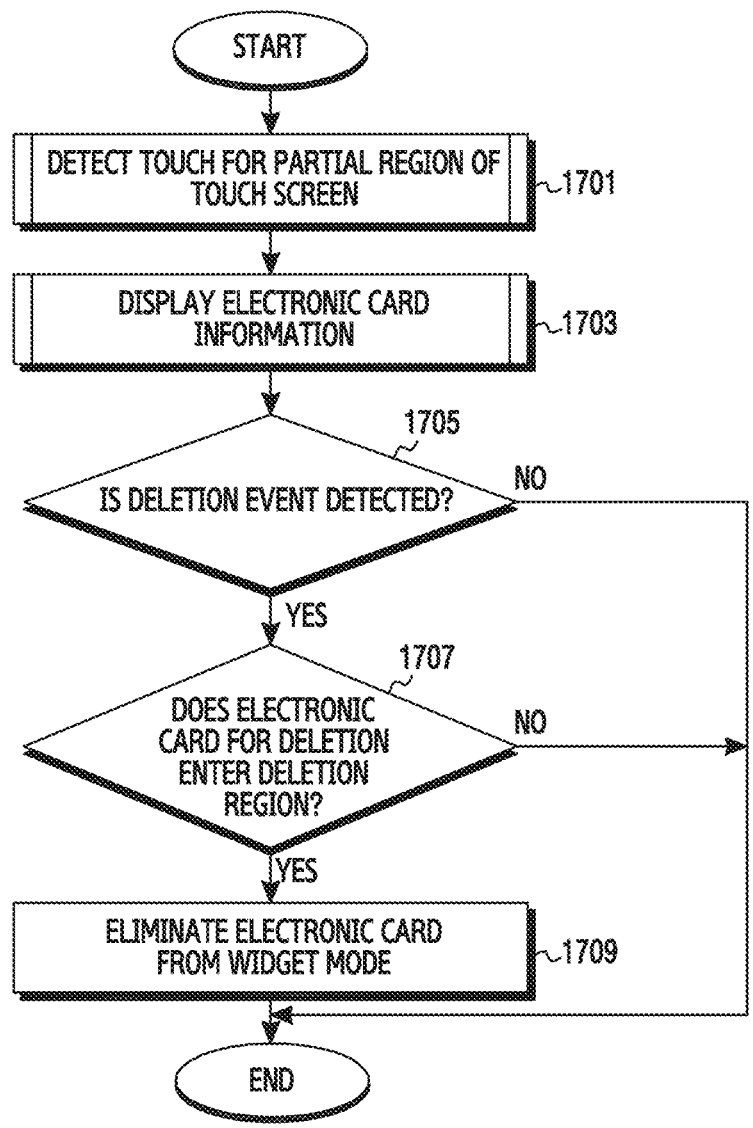
FIG. 17 is a flowchart illustrating eliminating an electronic card in a widget mode in an electronic device according to various embodiments of the present disclosure.
Figure 18:
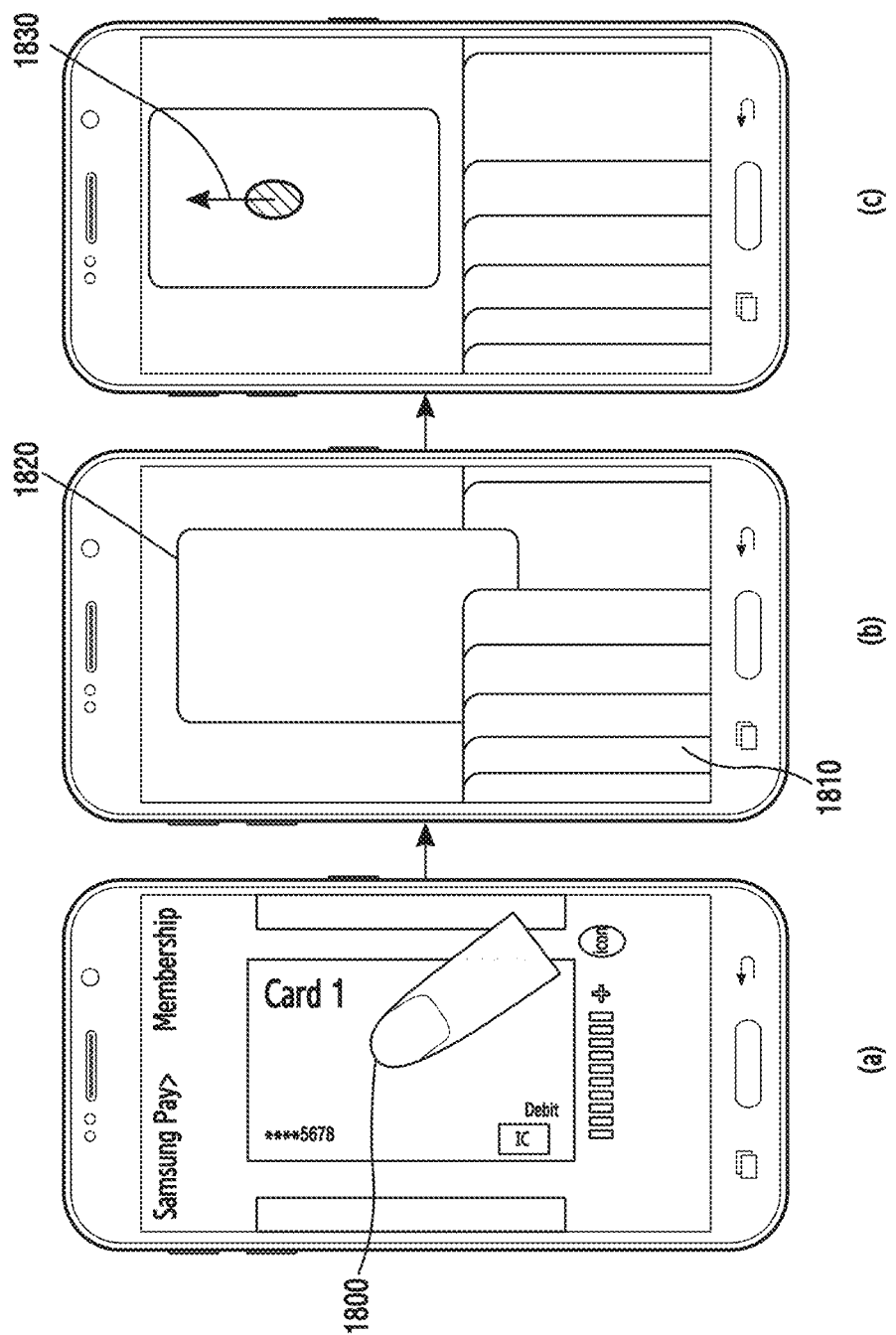
FIG. 18 illustrates a screen configuration for eliminating an electronic card in a widget mode in an electronic device according to various embodiments of the present disclosure.

FIG. 17 is a flowchart for eliminating an electronic card in a widget mode in an electronic device according to various embodiments of the present disclosure. In the following description, an operation for releasing the widget mode registration of an electronic card using the screen configuration of FIG. 18 will be described. FIG. 18 illustrates a screen configuration for eliminating an electronic card in a widget mode in an electronic device according to various embodiments of the present disclosure.

Referring to FIG. 17, in operation 1701, an electronic device (e.g., the electronic device 101) may detect a touch input for a widget mode execution region set on a touch screen. For example, the processor 120 may detect a touch and movement input 530 for the widget mode execution region set in a partial region of the touch screen adjacent to the home button 520 of the electronic device 500 in a state in which the display 160 is in an inactive state 510, as shown in FIG. 5A. For example, the processor 120 may detect a touch and movement input 532 for the widget mode execution region set in the partial region of the touch screen adjacent to the home button 520 of the electronic device 500 in a state in which the display 160 is in an active state 512.

In operation 1703, the electronic device may display at least one piece of electronic card information registered in the widget mode when the touch input for the widget mode execution region is detected. For example, when the touch input for the widget mode execution region is detected, the processor 120 may control the display 160 to display an image of the electronic card registered in the widget mode, as shown in FIG. 18A.

In operation 1705, the electronic device may confirm whether a card deletion event occurs. For example, the processor 120 may determine that the card deletion event has occurred when a touch input 1800 for the electronic card displayed on the widget mode screen as shown in FIG. 18A is maintained for a reference time.

In operation 1707, when the occurrence of the card deletion event is detected, the electronic device may confirm whether the electronic card for deletion enters a deletion region. For example, the processor 120 may control the display 160 to display a list of at least one electronic card registered in the widget mode, as shown in FIG. 18B. At this time, the processor 120 may control the display 160 to display the electronic card displayed on the widget mode screen as a state 1820 in which the electronic card is selected from the electronic card list, as shown in FIG. 18B. The processor 120 may confirm whether the electronic card enters a predetermined deletion region by a touch and movement input for the electronic card to be deleted, as shown in FIG. 18C. For example, the deletion region may be set as a partial region of the upper end of the touch screen.

In operation 1709, the electronic device may release the widget mode registration for the electronic device when the electronic card for deletion enters the deletion region. For example, when the image of the electronic card enters the deletion region, the processor 120 may eliminate the corresponding electronic card information from the widget mode screen, as shown in FIG. 18C.

According to various embodiments of the present disclosure, the electronic device may delete the corresponding electronic card from the widget mode when the release point of the touch and movement input for the electronic card is included in the deletion region.

Figure 19:
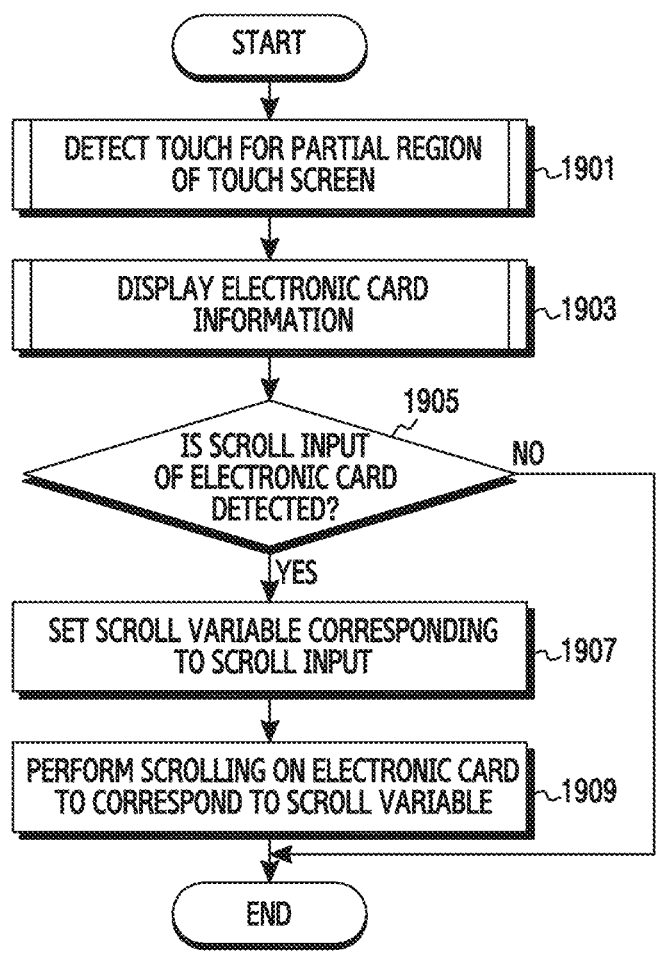
FIG. 19 is a flowchart illustrating scrolling electronic card information in an electronic device according to various embodiments of the present disclosure.
Figure 20:
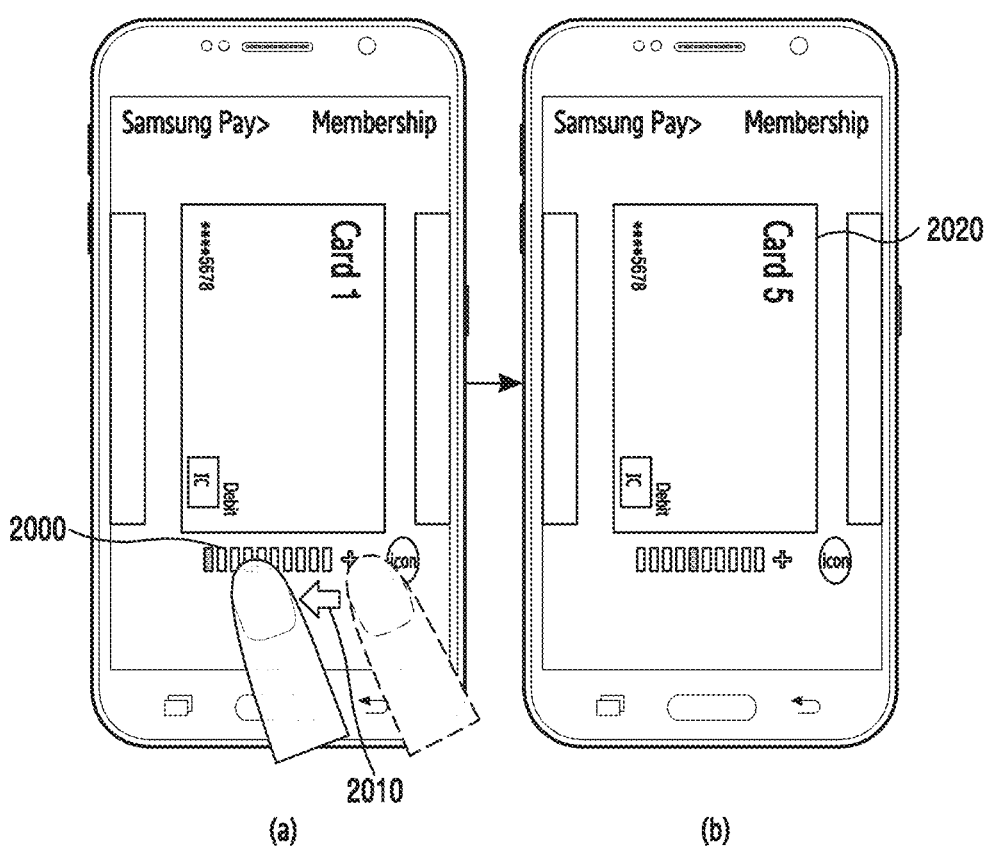
FIG. 20 illustrates a screen configuration for scrolling electronic card information in an electronic device according to various embodiments of the present disclosure.

FIG. 19 is a flowchart for scrolling electronic card information in an electronic device according to various embodiments of the present disclosure. In the following description, an operation for scrolling electronic card information in a widget mode screen using the screen configuration of FIG. 20 will be described. FIG. 20 illustrates a screen configuration for scrolling electronic card information in an electronic device according to various embodiments of the present disclosure.

Referring to FIG. 19, in operation 1901, an electronic device (e.g., the electronic device 101) may detect a touch input for a partial region set as a widget mode execution region on a touch screen. For example, the processor 120 may keep a touch detection function of the widget mode execution region active when a mode execution menu is activated. Accordingly, the processor 120 may detect a touch and movement input 530 or 532 for the widget mode execution region in a state in which the display 160 is inactivated 510 as shown in FIG. 5A or activated 512 as shown in FIG. 5B.

In operation 1903, the electronic device may display at least one piece of electronic card information registered in the widget mode when the touch input for the partial region of the touch screen set as the widget mode execution area is detected. For example, when the touch input for the widget mode execution region is detected, the processor 120 may control the display 160 to display the image of the electronic card registered in the widget mode, as shown in FIG. 20A.

In operation 1905, the electronic device may confirm whether a touch input for scrolling the electronic card list is detected on the widget mode screen. For example, the processor 120 may confirm whether a flick input 2010 for an entire card list icon 2000 is detected on the widget mode screen as shown in FIG. 20A. For example, the flick input may indicate a touch input where a touch and movement input occurs at a high speed. For example, the processor 120 may confirm whether a flick input for the electronic device information is detected on the widget mode screen. For example, the processor 120 may confirm whether a flick input for at least a portion of the left/right edge is detected on the widget mode screen.

In operation 1907, the electronic device may set a scroll variable corresponding to a scroll input when the scroll input for the electronic card is detected. For example, the processor 120 may determine at least one of a scroll speed and a scroll interval for scrolling the electronic card information based on at least one of a movement speed of the scroll input and a movement distance of the scroll input.

In operation 1909, the electronic device may perform scrolling on the electronic card information displayed on the widget mode screen based on the scroll variable corresponding to the scroll input for the electronic card. For example, when the processor 120 may detect the flick input 2010 for the entire card list icon 2000 as shown in FIG. 20A, the processor 120 may determine the scroll variable based on the flick input 2010. The processor 120 may scroll, in a section 2020, the electronic card information of the widget mode screen to correspond to the scroll variable determined by the flick input 2010 as shown in FIG. 20B.

Figure 21:
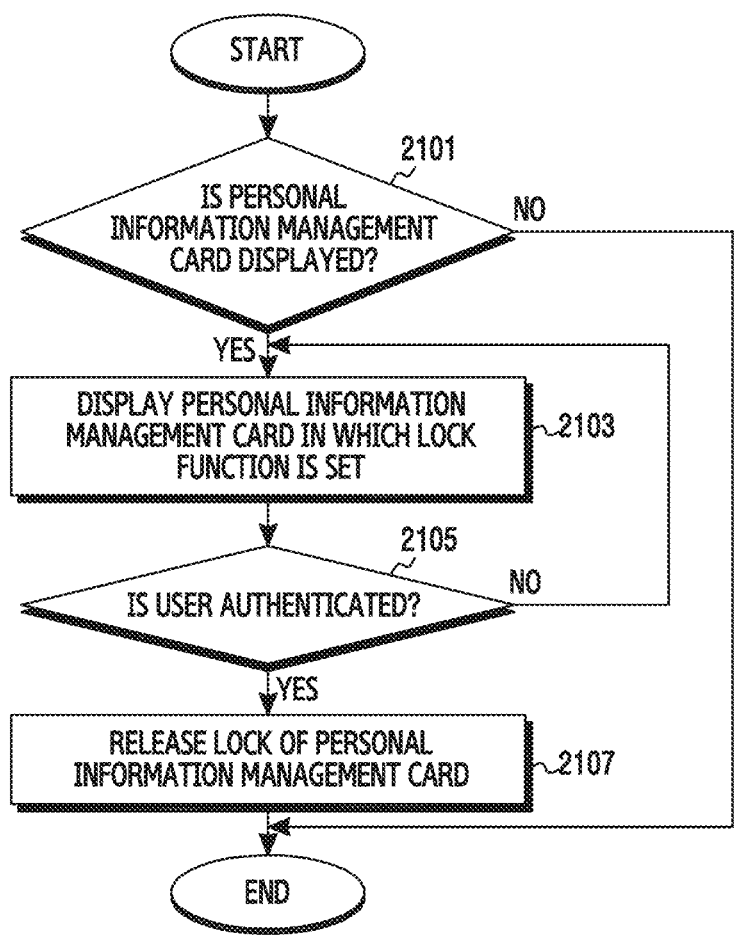
FIG. 21 is a flowchart illustrating displaying a personal information management card in an electronic device according to various embodiments of the present disclosure.
Figure 22A:
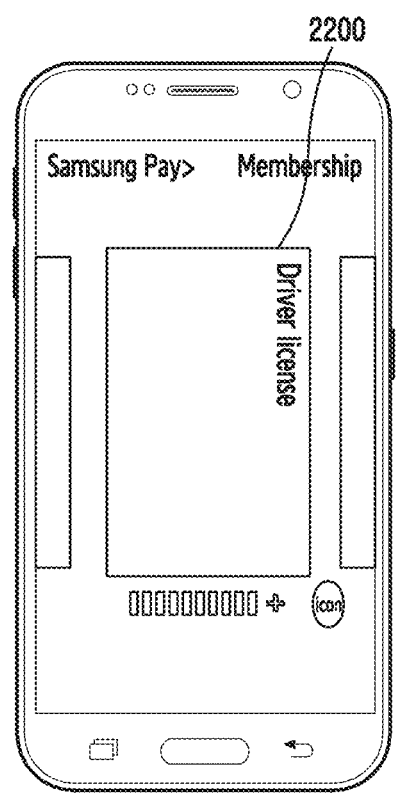
FIGS. 22A and 22B illustrate a screen configuration for displaying a personal information management card in an electronic device according to various embodiments of the present disclosure.
Figure 22B:
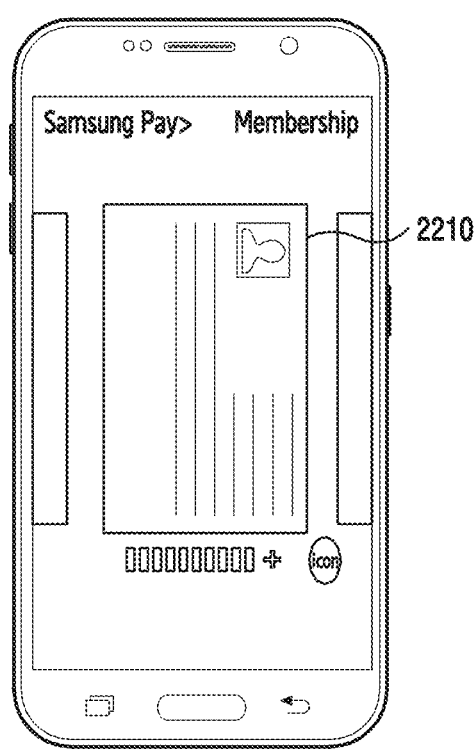

FIG. 21 is a flowchart for displaying a personal information management card in an electronic device according to various embodiments of the present disclosure. In the following description, an operation for displaying a personal information management card using the screen configurations of FIGS. 22A and 22B. FIGS. 22A and 22B illustrate a screen configuration for displaying a personal information management card in an electronic device according to various embodiments of the present disclosure.

Referring to FIG. 21, in operation 2101, an electronic device (e.g., the electronic device 101) may confirm whether a personal information management card is displayed in a widget mode. For example, the processor 120 may control the display 160 to display a widget mode screen including at least one piece of electronic card information when it detects a touch and motion input for a widget mode execution region. The processor 120 may confirm whether the personal information management card is selected as an electronic card to be displayed on the widget mode screen.

In operation 2103, when the electronic device displays the personal information management card in the widget mode, the electronic device may display personal information management card information in which a lock function is set, on the widget mode screen. For example, in order to prevent personal information included in the personal information management card from being leaked to the outside, the processor 120 may control the display 160 to display the personal information included in the personal information management card as a hidden state 2200.

In operation 2105, the electronic device may confirm whether a user is authorized to release the lock function of the personal information management card. For example, the processor 120 may confirm whether a user who can identify the personal information management card information is authenticated through fingerprint recognition. For example, the processor 120 may confirm whether a password mapped on the personal information management card is input.

In operation 2103, the electronic device may maintain the locked state of the personal information management card when the authentication of the user fails.

In operation 2107, when the user is authenticated, the electronic device may display the personal information included in the personal information management card by releasing the lock function of the personal information management card. For example, when the user of the personal information management card is authenticated, the processor 120 may release a hidden state of the personal information included in the personal information management card. In this case, the display 160 may display personal information 2210 included in the personal information management card, as shown in FIG. 22B, under the control of the processor 120.

Figure 23:
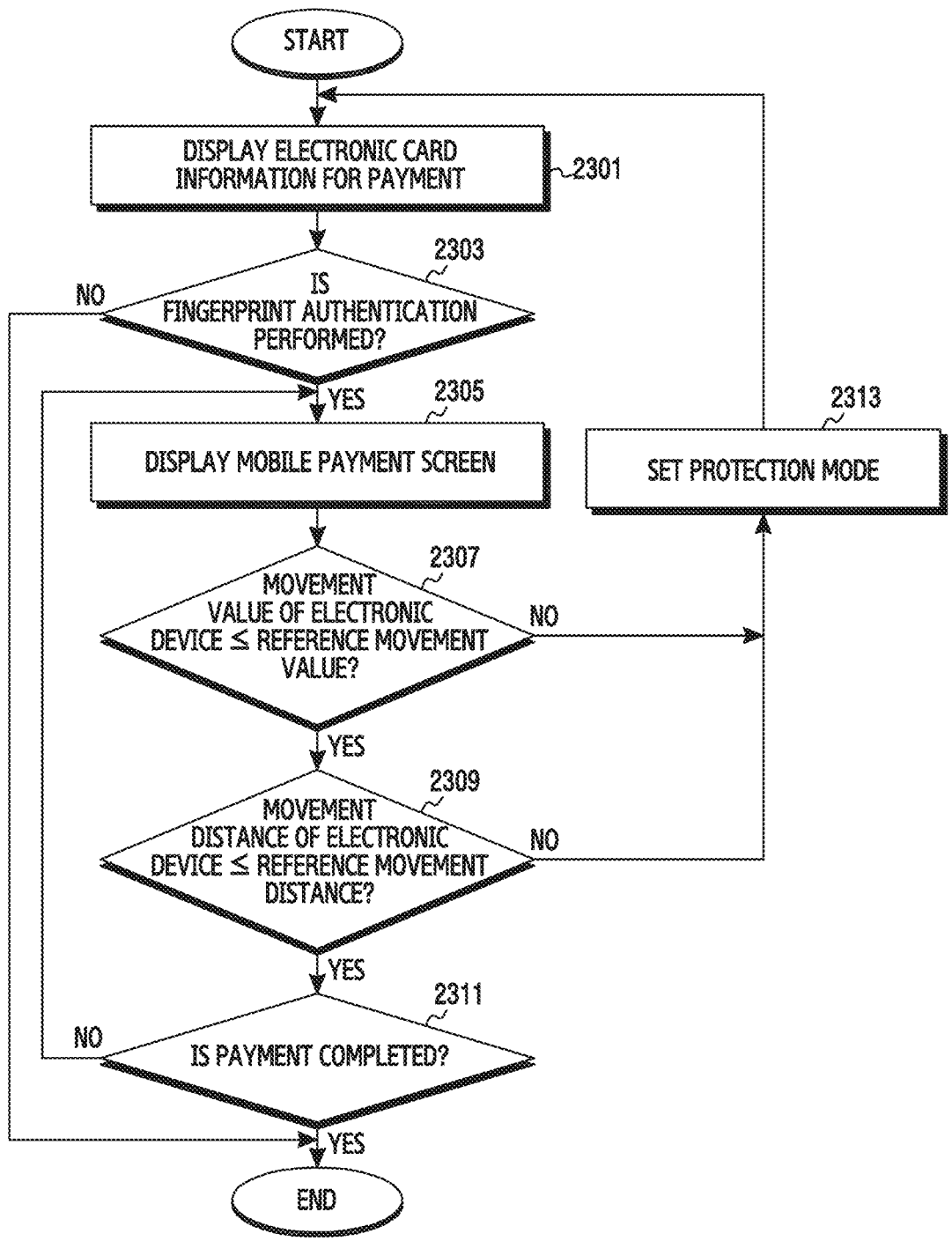
FIG. 23 is a flowchart illustrating configuring a protection mode based on movement information of an electronic device in the electronic device according to various embodiments of the present disclosure.

FIG. 23 is a flowchart for configuring a protection mode based on movement information of an electronic device in the electronic device according to various embodiments of the present disclosure.

Referring to FIG. 23, in operation 2301, an electronic device (e.g., the electronic device 101) may execute a widget mode to display electronic card information for payment. For example, the processor 120 may control the display 160 to display credit card information for payment or anonymous prepaid card information on a widget mode screen based on a touch input detected through the input/output interface 150 (touch screen).

In operation 2303, the electronic device may perform fingerprint authentication for a user to activate a payment service. For example, the processor 120 may compare fingerprint information acquired through a fingerprint recognition sensor (not shown) with fingerprint information previously stored in the memory 130 to determine whether the user is authenticated. For example, the fingerprint recognition sensor may be included in a home button or may be a separate module.

The electronic device may display an authentication failure message or maintain the display of the electronic card information for payment, when the user authentication fails.

In operation 2305, the electronic device may display a mobile payment screen in the widget mode when the user can be authenticated. For example, the processor 120 may control the display 160 to switch the electronic card information of the widget mode screen to the mobile payment screen when the user for electronic payment is authenticated.

In operation 2307, the electronic device may confirm whether a movement value of the electronic device is smaller than or equal to a reference movement value. For example, the processor 120 may estimate the movement value of the electronic device using at least one sensor capable of detecting the movement of the electronic device. The processor 120 may compare the movement value of the electronic device with the reference movement value stored in the memory 130. For example, the at least one sensor may include motion sensors such as an acceleration sensor, a gyroscope, an air pressure sensor, a geomagnetic sensor, and the like.

In operation 2309, the electronic device may confirm whether a movement distance of the electronic device is less than or equal to a reference movement distance when the movement value of the electronic device is equal to or smaller than the reference movement value. For example, the processor 120 may estimate the movement distance of the electronic device using at least one sensor capable of detecting the movement of the electronic device. The processor 120 may compare the movement distance of the electronic device with the reference movement distance stored in the memory 130.

In operation 2311, the electronic device may confirm whether mobile payment is completed when the movement distance of the electronic device is less than or equal to the reference movement distance. For example, the processor 120 may confirm whether the electronic device 101 is brought into contact with or is not brought into contact with a POS device to make mobile payment. For example, the POS device may include a payment device capable of recognizing the electronic card using short-distance communication.

In operation 2305, when the payment has not been completed, the electronic device may maintain the display of the mobile payment screen.

In operation 2313, the electronic device may set a protection mode to limit unnecessary payment when the movement value of the electronic device exceeds the reference movement value or the movement distance of the electronic device exceeds the reference movement distance. For example, when the movement value of the electronic device exceeds the reference movement value while the payment service is activated, the processor 120 may determine that the electronic device is moving and may set the protection mode so that a wrong payment is not approved. For example, the processor 120 may determine that the electronic device is lost and may set the protection mode when the movement distance of the electronic device exceeds the reference movement distance while the payment service is activated. For example, the processor 120 may perform fingerprint authentication again or set the protection mode for inputting an additional password.

In operation 2301, the electronic device may display the electronic card information for payment to perform fingerprint authentication again when the protection mode is set. By way of another example, the electronic device may display a password entry window for releasing the protection mode.

Figure 24:
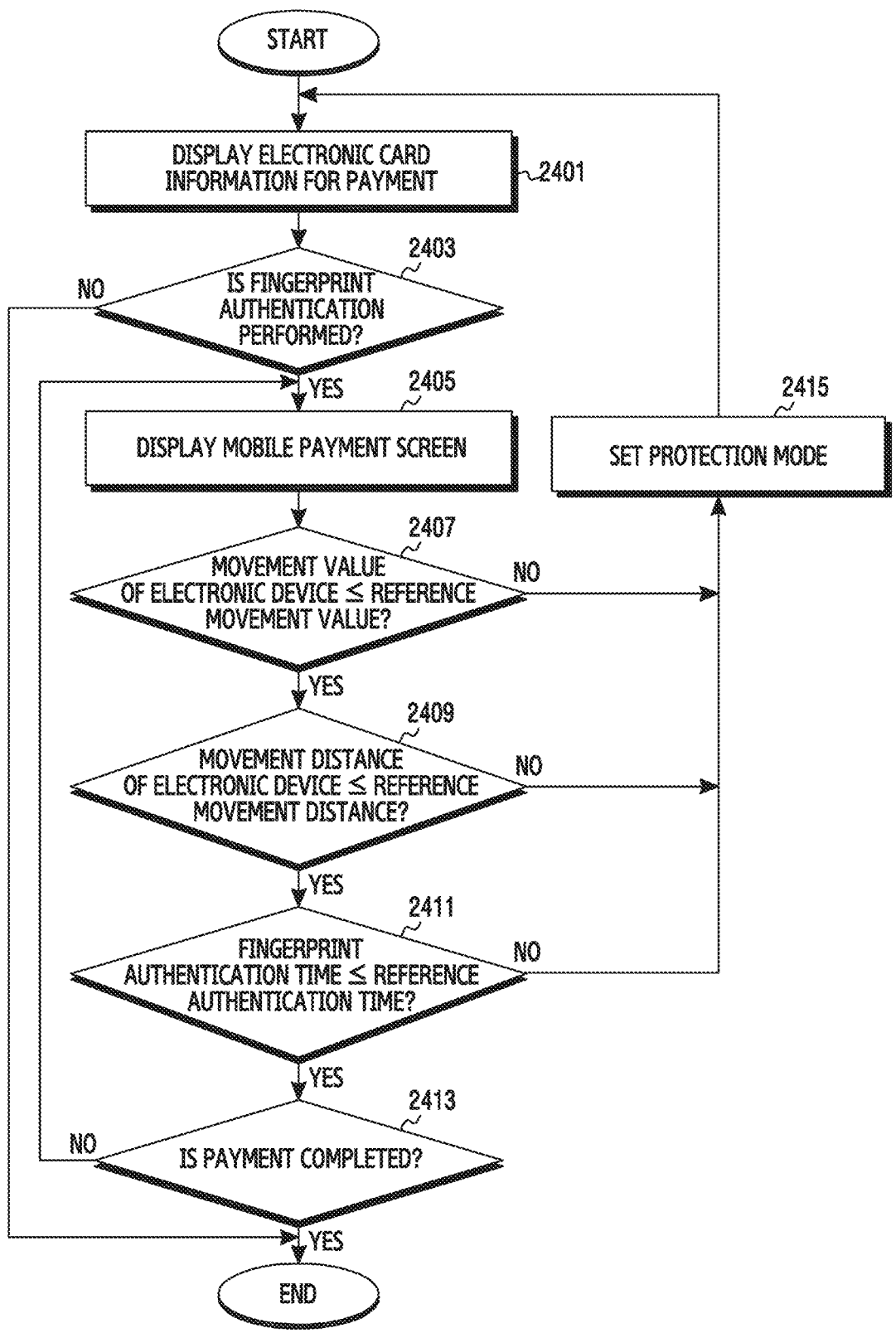
FIG. 24 is a flowchart illustrating configuring a protection mode based on movement information and time information of an electronic device in an electronic device according to various embodiments of the present disclosure.

FIG. 24 is a flowchart for configuring a protection mode based on movement information and time information of an electronic device in an electronic device according to various embodiments of the present disclosure.

Referring to FIG. 24, in operation 2401, an electronic device (e.g., the electronic device 101) may display electronic card information for payment on a widget mode screen. For example, when a touch input for a widget mode execution region is detected, the processor 120 may control the display 160 to display a widget mode screen including at least one piece of electronic card information. The processor 120 may control the display 160 to display the electronic card information for payment on the widget mode screen.

In operation 2403, the electronic device may perform fingerprint authentication for a user to perform mobile payment using the electronic card information for payment displayed on the widget mode screen. For example, the processor 120 may confirm whether fingerprint information acquired through a fingerprint recognition sensor (not shown) is included in fingerprint information previously stored for mobile payment approval.

The electronic device may display an authentication failure message or maintain the display of the electronic card information for payment when the user authentication fails.

In operation 2405, the electronic device may display a mobile payment screen on the widget mode screen when the user can be authenticated. For example, the display 160 may additionally display mobile payment information in the electronic card information of the widget mode screen.

In operation 2407, the electronic device may confirm whether the movement value of the electronic device is smaller than or equal to the reference movement value. For example, the processor 120 may estimate the movement value of the electronic device using a motion sensor functionally connected to the electronic device. The processor 120 may compare the movement value of the electronic device with the reference movement value stored in the memory 130.

In operation 2409, when the movement value of the electronic device is smaller than or equal to the reference movement value, the electronic device may confirm whether the movement distance of the electronic device is less than or equal to the reference movement distance. For example, the processor 120 may compare the movement distance of the electronic device estimated through the motion sensor with the reference movement distance stored in the memory 130.

In operation 2411, when the movement distance of the electronic device is equal to or less than the reference movement distance, the electronic device may confirm whether a fingerprint authentication time is less than or equal to a reference authentication time. For example, the processor 120 may confirm whether an elapsed time from the time of authenticating the user through the fingerprint authentication in operation 2403 exceeds a reference authentication time previously stored in the memory 130.

In operation 2413, the electronic device may confirm whether the mobile payment is completed when the fingerprint authentication time of the electronic device is less than or equal to the reference authentication time. For example, the processor 120 may determine that the mobile payment is valid when the fingerprint authentication time of the electronic device is less than or equal to the reference authentication time. Accordingly, the processor 120 may confirm whether the electronic device 101 is brought into contact with or is not brought into contact with the POS device to make mobile payment.

In operation 2405, when the payment is not completed, the electronic device may maintain the display of the mobile payment screen.

In operation 2415, when the movement value of the electronic device exceeds the reference movement value, when the movement distance of the electronic device exceeds the reference movement distance, or when the fingerprint authentication time exceeds the reference authentication time, the electronic device may set a protection mode to limit unnecessary payment.

In operation 2401, when the protection mode is set, the electronic device may display the electronic card information for payment to perform the fingerprint authentication again. By way of another example, the electronic device may display a password entry window for releasing the protection mode.

Figure 25:
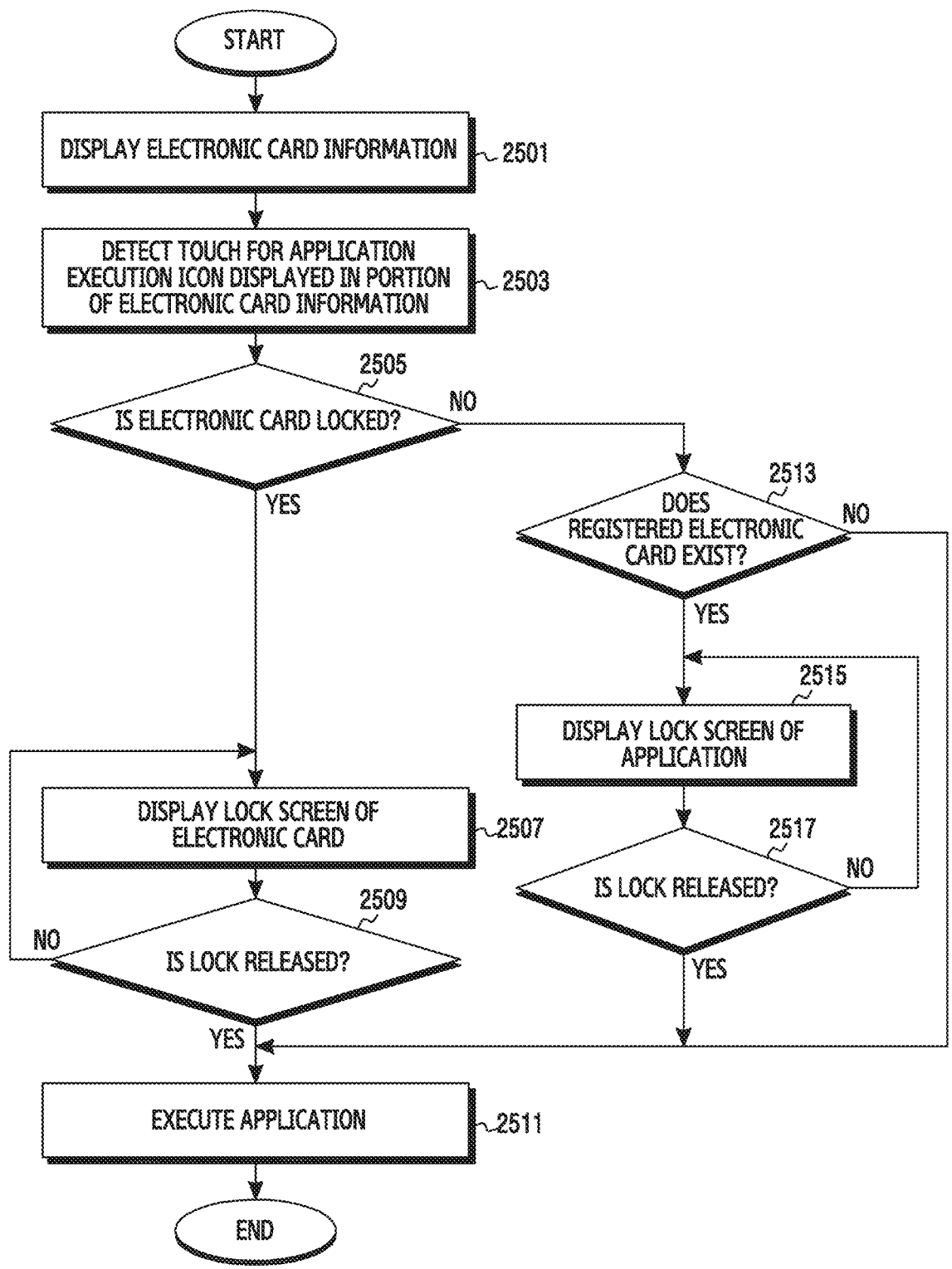
FIG. 25 is a flowchart illustrating lock setting in an electronic device according to various embodiments of the present disclosure.
Figure 26A:
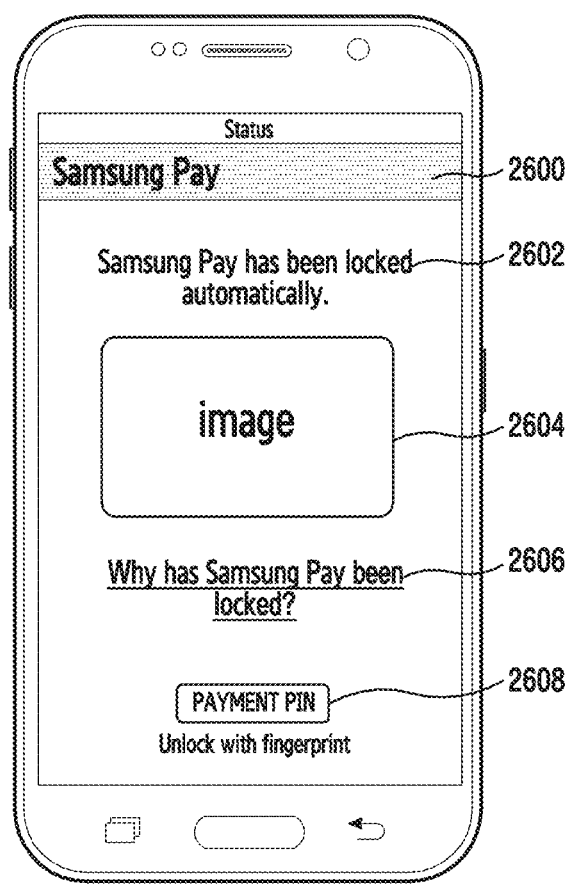
FIGS. 26A to 26C illustrate a screen configuration for establishing locks in an electronic device according to various embodiments of the present disclosure.
Figure 26B:
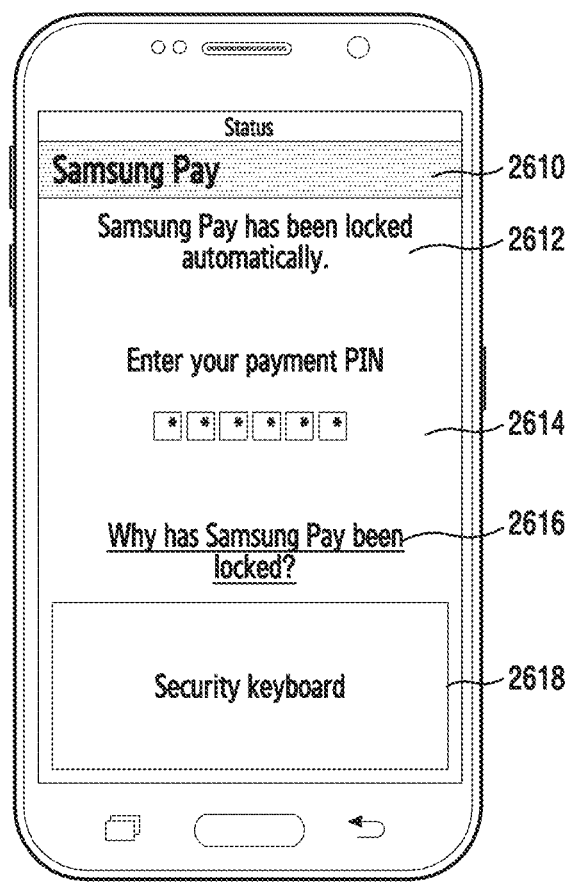
Figure 26C:
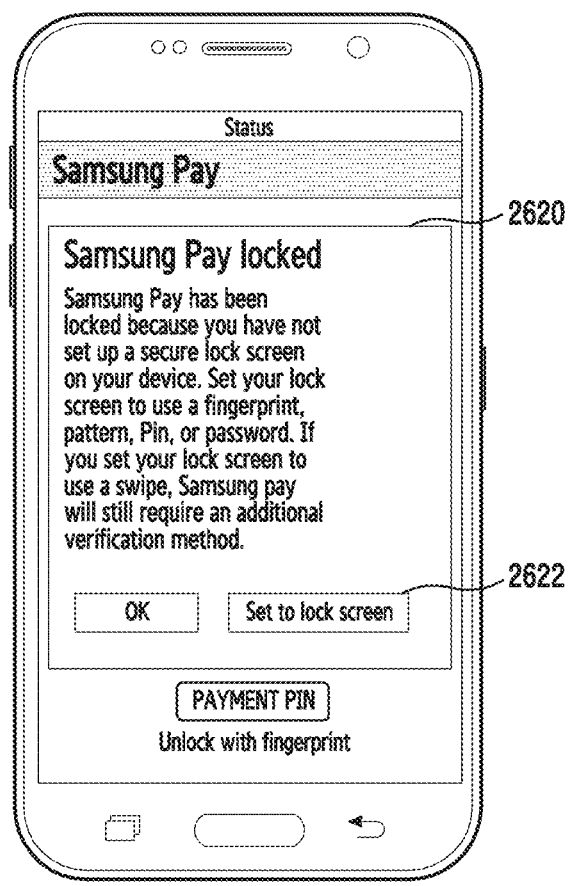

FIG. 25 is a flowchart for lock setting in an electronic device according to various embodiments of the present disclosure. In the following description, an operation for lock setting using the screen configurations of FIGS. 26A to 26C will be described. FIGS. 26A to 26C illustrate a screen configuration for establishing locks in an electronic device according to various embodiments of the present disclosure.

Referring to FIG. 25, in operation 2501, an electronic device (e.g., the electronic device 101) may display electronic card information through a widget mode. For example, when a touch input for a widget mode execution region set in a partial region of a touch screen is detected, the processor 120 may control the display 160 to display the widget mode screen including electronic card information 540 registered in the widget mode as shown in FIG. 5C.

In operation 2503, the electronic device may detect a touch input for an application execution icon included in the widget mode screen. For example, the processor 120 may detect a tap input for an application execution icon (Samsung pay) 560 in the widget mode screen as shown in FIG. 5C.

In operation 2505, the electronic device may confirm whether a lock function of the electronic device is set. For example, the processor 120 may confirm whether a lock menu of the electronic device is in an active state.

In operation 2507, the electronic device may display a lock screen when the lock function of the electronic device is set. For example, the processor 120 may control the display 160 to display a predetermined image as the lock screen when the lock function of the electronic device is set. For example, the lock screen may include a password input screen when a password input is set by the lock function.

In operation 2509, the electronic device may confirm whether the electronic device is unlocked based on input information for the lock screen of the electronic device displayed on the display. For example, the processor 120 may confirm whether a touch and movement input for the lock screen of the electronic device displayed on the display 160 is detected above a reference distance. For example, the processor 120 may confirm whether a predetermined password for unlocking the electronic device is input through a password input screen displayed on the display 160.

In operation 2507, when the electronic device is not unlocked, the electronic device may maintain the lock screen of the electronic device displayed on the display.

In operation 2511, the electronic device may execute the application corresponding to the widget mode when the electronic device is unlocked. For example, the processor 120 may control the display 160 to display an execution screen of the application corresponding to the widget mode.

In operation 2513, when the lock function of the electronic device is not set, the electronic device may confirm whether there is an electronic card registered in the application corresponding to the widget mode.

In operation 2511, when there is no electronic card registered in the application corresponding to the widget mode, the electronic device may execute the application corresponding to the widget mode.

In operation 2515, the electronic device may display a lock screen of the application when there is at least one electronic card registered in the electronic device. For example, the processor 120 may activate the lock function of the application corresponding to the widget mode when there is at least one electronic card registered in the electronic device. Accordingly, the display 160 may display either a lock screen 2600 for fingerprint authentication as shown in FIG. 26A or a lock screen 2610 for a password input as shown in FIG. 26B. For example, the lock screen 2600 for fingerprint authentication may include lock status information 2602 of the application, an image 2604 of a representative electronic card registered in the application, a reason icon 2606 of setting the locked status of the application, and guidance information 2608 of fingerprint authentication for releasing the lock. For example, the lock screen 2610 for the password input may include locked status information 2612 of the application, a password input window 2614, a reason icon 2616 for the locked status of the application, and a keyboard 2618 for inputting a password.

In operation 2517, the electronic device may confirm whether the application is unlocked through authentication corresponding to the lock screen of the application displayed on the display. For example, when the lock screen 2600 for fingerprint authentication is displayed as shown in FIG. 26A, the processor 120 may confirm whether the application is unlocked through the fingerprint authentication of the user. For example, when the lock screen 2610 for the password input is displayed as shown in FIG. 26B, the processor 120 may confirm whether the application is unlocked based on the password information input through the keypad 2618.

In operation 2515, when the application is not unlocked, the electronic device may maintain the lock screen of the application displayed on the display.

In operation 2511, when the application is unlocked, the electronic device may execute the application corresponding to the widget mode.

According to one embodiment, the electronic device may set the lock function of the electronic device through the lock screen of the application. For example, when a touch input for the reason icon 2606 or 2616 of setting of the locked status of the application is detected on the lock screen 2600 or 2610 of the application of FIG. 26A or FIG. 26B, the processor 120 may control the display 160 to display detailed information 2620 in which the lock function of the application corresponding to the widget mode is set is displayed as shown in FIG. 26C. When a touch input for an icon 2622 for setting to lock the corresponding screen, which is included in the detailed information 2620 in which the lock function is set, is detected, the processor 120 may activate the lock setting menu of the electronic device. The processor 120 may set the lock function of the electronic device based on input information on the lock setting menu of the electronic device. For example, the processor 120 may control the display 160 to display the lock screen of the electronic device when the lock function of the electronic device is set.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a program module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The embodiments disclosed herein are provided merely to easily describe technical details of the present disclosure and to help the understanding of the present disclosure, and are not intended to limit the scope of various embodiments of the present disclosure. Therefore, it should be construed that all modifications and changes or various other embodiments based on the technical idea of various embodiments of the present disclosure fall within the scope of various embodiments of the present disclosure.

The invention claimed is:

1. An electronic device comprising:
a touch screen; and
a processor configured to:
control the touch screen to display a first screen corresponding to at least one electronic card when a touch input for at least a partial region of the touch screen is detected, wherein the at least one electronic card comprises a card for payment,
control the touch screen to display a second screen corresponding to a membership management service so that the second screen is partially overlapped with the first screen when a touch input for a membership management service icon included in the partial region of the first screen is detected, wherein a portion of a region of the first screen not overlapped with the second screen is set as a touch active region, and
control the touch screen to eliminate the display of the second screen when a touch input for the touch active region is detected,
wherein the display of the second screen comprises display of a plurality of membership management card icons arranged according to a determined display priority to display a plurality of membership management cards, the determined display priority based on at least one of beacon information that the electronic device receives or a popularity ranking of an associated membership management card, and
wherein the membership management cards are distinct from the card for payment.

2. The electronic device of claim 1,
wherein the processor is further configured to control the touch screen to display the first screen corresponding to at least one electronic card registered in a widget mode, when the touch input for the at least the partial region of the touch screen is detected, and
wherein the at least one electronic card further includes a banking card.

3. The electronic device of claim 1, wherein the processor is further configured to control the touch screen to display the second screen corresponding to the membership management service to be overlapped with the partial region of the first screen, when the touch input for the membership management service icon included in the partial region of the first screen is detected.

4. The electronic device of claim 1, wherein the processor is further configured to control the touch screen to display the second screen including at least one membership management card icon and a membership management code corresponding to any one membership management card, when the touch input for the membership management service icon included in the partial region of the first screen is detected.

5. The electronic device of claim 4,
wherein the processor is further configured to:
arrange the at least one membership management card icon based on the determined display priority of the membership management card, and
control the touch screen to display the second screen including the arranged at least one membership management card icon, and
wherein the determined display priority of the membership management card is further determined based on at least one of a location of the electronic device and a frequency of use of the membership management card.

6. The electronic device of claim 4, wherein the processor is further configured to:
detect a touch and movement input for at least one membership management card icon is detected among the plurality of membership management card icons included in the second screen, and
register, in a widget mode, a membership management card corresponding to the at least one membership management card icon in which the touch and movement input is detected, when the at least one membership management card icon is moved to a partial region in which the first screen is displayed based on the touch and movement input.

7. The electronic device of claim 1, wherein the processor is further configured to control the touch screen to display the first screen including the at least one electronic card and a guidance message corresponding to a type of the at least one electronic card.

8. The electronic device of claim 1, wherein the processor is further configured to:
set a lock function in a personal information management card when the personal information management card is displayed through the first screen, and
control the touch screen to display personal information included in the personal information management card when security authentication for the personal information management card is completed.

9. The electronic device of claim 1, wherein the processor is further configured to control the touch screen to display detailed information on the at least one electronic card when a touch input for the electronic device displayed through the first screen is detected.

10. The electronic device of claim 1, wherein the processor is further configured to:
activate a mobile payment function using the at least one electronic card when security authentication for the at least one electronic card displayed through the first screen is completed, and
set a security mode for the mobile payment function of the at least one electronic card based on at least one of movement information of the electronic device and a security authentication elapsed time.

11. The electronic device of claim 1,
wherein the processor is further configured to:
set, when a touch input for changing electronic card information displayed on the first screen is detected, a scroll variable based on at least one of a region in which the touch input is detected, a movement speed of the touch input, or a movement distance of the touch input, and
change the electronic card information displayed on the first screen to correspond to the scroll variable, and
wherein the scroll variable includes at least one of a scroll speed or a scroll interval.

12. The electronic device of claim 1, further comprising:
a button configured to be located at a lower end of the touch screen,
wherein the processor is further configured to control the touch screen to display the first screen corresponding to at least one electronic card when a touch input for the partial region of the touch screen adjacent to the button is detected.

13. The electronic device of claim 12,
wherein the button includes a fingerprint sensor, and
wherein the processor is further configured to authenticate a user using a user fingerprint received through the fingerprint sensor.

14. An operating method of an electronic device, comprising:
detecting a touch input for at least a partial region of a touch screen operatively connected to the electronic device;
displaying a first screen corresponding to at least one electronic card in response to the touch input, wherein the at least one electronic card comprises a card for payment;
detecting a touch input for a membership management service icon included in a partial region of the first screen;
displaying a second screen corresponding to a membership management service so that the second screen is partially overlapped with the first screen in response to the touch input for the membership management service icon, wherein a portion of a region of the first screen not overlapped with the second screen is set as a touch active region;
detecting a touch input for the touch active region; and
eliminating the displaying of the second screen, in response to the touch input for the touch active region,
wherein the displaying of the second screen comprises displaying a plurality of membership management card icons arranged according to a determined display priority to display a plurality of membership management cards, the determined display priority based on at least one of beacon information that the electronic device receives or a popularity ranking of an associated membership management card, and
wherein the membership management cards are distinct from the card for payment.

15. The method of claim 14,
wherein the displaying the first screen comprises displaying the first screen corresponding to at least one electronic card registered in a widget mode, when the touch input for the at least the partial region of the touch screen is detected, and
wherein the at least one electronic card further includes a banking card.

16. The method of claim 14,
wherein the displaying the second screen comprises displaying the second screen corresponding to the membership management service to be overlapped with the partial region of the first screen, when the touch input for the membership management service icon included in the partial region of the first screen is detected.

17. The method of claim 14, wherein the displaying the second screen comprises displaying the second screen including at least one membership management card icon and a membership management code corresponding to any one membership management card, when the touch input for the membership management service icon included in the partial region of the first screen is detected.

18. The method of claim 17,
wherein the displaying the second screen comprises:
arranging the at least one membership management card icon based on the determined display priority of the membership management card, and
displaying the second screen including the arranged at least one membership management card icon, and
wherein the determined display priority of the membership management card is further determined based on at least one of a location of the electronic device and a frequency of use of the membership management card.

19. The method of claim 17, further comprising:
detecting a touch and movement input for at least one membership management card icon is detected among the at least one membership management card icon included in the second screen, and
registering, in a widget mode, a membership management card corresponding to the at least one membership management card icon in which the touch and movement input is detected, when the at least one membership management card icon is moved to a partial region in which the first screen is displayed based on the touch and movement input.

* * * * *